United States Patent [19]
Hsu et al.

[11] Patent Number: 5,425,039
[45] Date of Patent: Jun. 13, 1995

[54] SINGLE-FREQUENCY FIBER FABRY-PEROT MICRO LASERS

[75] Inventors: Kevin Hsu, Roswell; Calvin M. Miller, Atlanta, both of Ga.; David N. Payne, Hamble; Jon-Thomas Kringlebotn, Southampton, both of United Kingdom

[73] Assignees: Micron Optics, Inc., Atlanta, Ga.; University of Southampton, Southampton, United Kingdom

[21] Appl. No.: 201,197

[22] Filed: Feb. 24, 1994

[51] Int. Cl.[6] .............................................. H01S 3/30
[52] U.S. Cl. ......................................... 372/6; 372/99; 385/49; 385/64; 385/73; 385/75
[58] Field of Search ............... 372/6, 92, 97, 98, 99, 372/103; 385/49, 64, 73, 75

[56] References Cited

U.S. PATENT DOCUMENTS

| | | | |
|---|---|---|---|
| 4,358,851 | 11/1982 | Scifres et al. | 372/97 |
| 4,545,644 | 10/1985 | DeVeau, Jr. et al. | 385/64 |
| 4,680,767 | 7/1987 | Hakimi et al. | 372/6 |
| 4,780,877 | 10/1988 | Snitzer | 372/6 |
| 4,782,491 | 11/1988 | Snitzer | 372/6 |
| 4,955,025 | 9/1990 | Mears et al. | 372/6 |
| 5,062,684 | 11/1991 | Clayton et al. | 385/27 |
| 5,073,004 | 12/1991 | Clayton et al. | 385/27 |
| 5,208,886 | 5/1993 | Clayton et al. | 385/73 |
| 5,212,745 | 5/1993 | Miller | 385/25 |
| 5,212,746 | 5/1993 | Miller et al. | 385/25 |
| 5,289,552 | 2/1994 | Miller et al. | 385/73 |

FOREIGN PATENT DOCUMENTS

| | | | |
|---|---|---|---|
| 0457484A2 | 11/1991 | European Pat. Off. | G02B 6/26 |
| 0533324A2 | 3/1993 | European Pat. Off. | H01S 3/17 |

OTHER PUBLICATIONS

A. E. Siegman, (1986) *Lasers*, Univeristy Science Books, Mill Valley, Calif., Ch.13: "Oscillation Dynamics and Oscillation Threshold", pp. 524–531 book.

G. P. Agrawal and N. K. Dutta (1986) *Long Wavelength Semiconductor Lasers*, Van Nostrand Rheinhold Comp., New York, Ch. 8: "Coupled-Cavity Semiconductor Lasers", pp. 333–371.

M. A. Hunter (1961) Metals Handbook, American Society of Metals 8th Ed. (Taylor Lyman, ed.) vol. 1, pp. 816–819 (no month available).

C. M. Miller and F. J. Janniello (Dec. 1990) *Electronics Letters* 26:2122–2123.

I. P. Kaminow (Oct. 1987) *Electronic Letters* 23:1102–1103.

Fishman et al. (Sep. 1990) *Photo. Tech. Letters* 9:662–664.

J. T. Kringlebotn et al. (1993) "Efficient Single-Frequency Erbium:Ytterbium Fibre Laser", 19th European Conference on Optical Communication, 2:65–68 (no month available).

P. Laporta et al. (Aug. 1993) "Diode-pumped Microchip Er-Yb:glass laser", *Optics Lett.* 18:1232–1234.

C. V. Poulsen and M. Sekja (Jun. 1993) "Highly Optimized Tunable $Er^{3+}$-Doped Single Longitudinal Mode Fiber Ring Laser, Experiment and Model", *IEEE Photonics Tech. Lett.* 5:646–648.

(List continued on next page.)

*Primary Examiner*—Frank Gonzalez
*Attorney, Agent, or Firm*—Greenlee & Winner

[57] ABSTRACT

Compact, fixed-wavelength and tunable fiber optic lasers combine a sub-millimeter length of high-gain rare-earth-doped, sensitized glass fiber within a fiber Fabry-Perot (FFP) cavity. Tunable, single-frequency fiber lasers at 1535 nm employing high-gain erbium:ytterbium phosphate glass fiber are specifically provided. Single-frequency and/or single-polarization mode erbium:ytterbium glass fiber lasers, having cavity lengths less than about 200 μm with continuous wavelength tuning range over several nanometers are provided. Amplified single-frequency lasers incorporating fiber rare-earth ion optical amplifiers are also provided. Single-frequency lasing employing sub-millimeter lengths of rare-earth doped sensitized fiber in a 3 mirror laser design is also demonstrated.

36 Claims, 14 Drawing Sheets

OTHER PUBLICATIONS

G. A. Ball et al. (Nov. 1993) "Polarimetric heterodyning Bragg-grating Fiber-laser Sensor" *Optics Letters* 18(22):1976–1978.

G. A. Ball et al. (1993) "Low Noise Single Frequency Linear Fibre Laser" *Electronics Letts.* 29(18):1623–1625 (no month available).

G. A. Ball et al. (Jun. 1993) "Modeling of Short, Single-Frequency, Fiber Lasers in High-Gain Fiber" *IEEE Photonics Tech. Letts.* 5(6):649–651.

G. A. Ball and W. H. Glen (Oct. 1992) "Design of a Single-Mode Linear-Cavity Erbium Fiber Laser Utilizing Bragg Reflectors", *J. Lightwave Tech.* 10(10): 1338–1343.

G. A. Ball and W. W. Morey (1992) "Narrow-linewidth fiber laser with integrated Master Oscillator–power amplifier", Conference on Optical Fiber Communications (OFC'92) session WA3, p. 97, no month available.

Zyskind et al. (Jul. 1992) "Short Single Frequency Erbium–Doped Fibre Laser", *Electronic Lett.* 15(28):1385–1387.

G. A. Ball and W. W. Morey (Mar. 1992) "Continuously tunable single-mode erbium fiber laser", *Optics Lett.* 17(6):420–421.

G. Grasso et al. (1991) "Single Longitudinal Mode Operation of an Erbium-Doped Fiber Laser with Microoptics Fabry–Perot Interferometer", 17th European Conference on Optical Communication, 1:149–152, no month available.

J. E. Townsend et al. (Oct. 1991) "$Yb^{2+}$ Sensitised $Er^{3+}$ Doped Silica Optical Fibre with Ultrahigh Transfer Efficiency and Gain", *Electronics Lett.* 21(27):1958–1959.

J. E. Townsend et al. (1992) "$Yb^{2+}$ Sensitized $Er^{3+}$ Doped Silica Optical Fibre with Ultrahigh Transfer Efficiency and Gain", Materials Res. Soc. Symp. Proceedings 244:143–147 (Materials Research Society), no month available.

L. Reekie et al. (Jul. 1986) "Tunable Single-Mode Fiber Lasers", *J. Lightwave Tech.*, LT-4, p. 956.

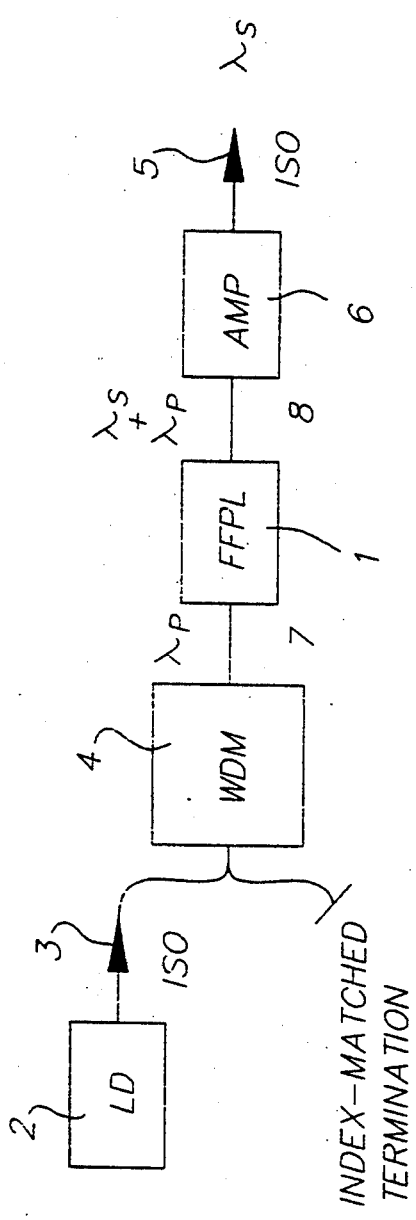
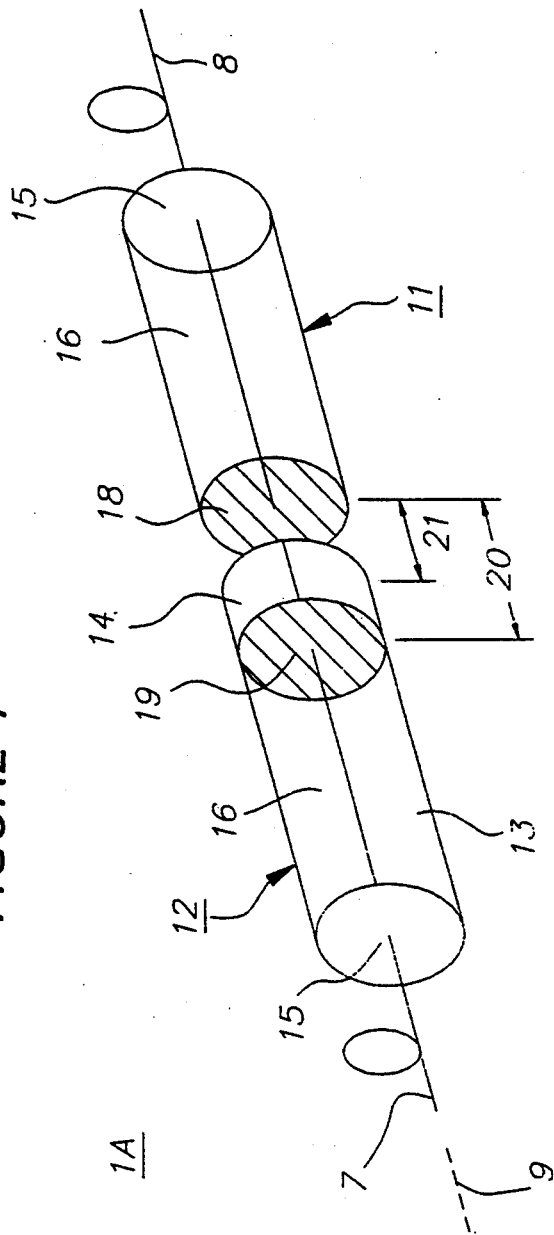
FIGURE 1
FIGURE 2

SINGLE-FREQUENCY FIBER FABRY-PEROT MICRO LASERS

FIELD OF THE INVENTION

This invention relates to fiber optic lasers in general and more specifically to tunable and fixed wavelength single-frequency lasers useful in optical communications systems.

BACKGROUND OF THE INVENTION

Erbium fiber lasers emitting in the 1.55 μm wavelength region have been under intensive research for applications in telecommunications, spectroscopy and fiber sensors. To achieve single-frequency operation, fiber lasers constructed with either Fabry-Perot (FP) cavities or ring cavities have wavelength filtering components such as external gratings (L. Reekie, R. J. Mears, S. B. Poole, and D. N. Payne (1986) J. Lightwave Tech., LT-4, p.956), in-fiber gratings (J. T. Kringlebotn, P. R. Morkel, L. Reekie, J. L. Archambault, and D. N. Payne (1993) 19th European Conference on Optical Communication, 2:65; G. A. Ball and W. H. Glen (1992) J. Lightwave Tech. 10(10): 1338–43; G. A. Ball and W. W. Morey (1992) Conference on Optical Fiber Communications (OFC'92) session WA3, p.97), and Fabry-Perot filters (FFPs) (G. Grasso, A. Righetti, and F. Fontana (1991) 17th European Conference on Optical Communication, 1:149. and C. V. Poulsen and M. Sekja (1993) IEEE Photonics Tech. Lett. 5:646). Wavelength is tuned by filter adjustments. Recently, (P. Laporta, S. Taccheo, S. Longhi, and O. Svelto (1993) Optics Lett. 18:1232 reported single longitudinal mode operation of a microchip erbium:ytterbium (Er:Yb) phosphate glass laser in a 200-μm FP cavity without additional filtering. The ultra short length of the active medium in this bulk glass laser allows single-frequency, narrow-bandwidth (reportedly 0.85 kHz) operation tunable over about 1 nm by changing the temperature of the microchip. Prior to the present invention, lasing had not been demonstrated in fiber lasers with fiber lengths less than about a few centimeters even when high gain Er:Yb codoped fiber was employed. Kringlebotn et al., supra.

SUMMARY OF THE INVENTION

This invention provides ultra-short (i.e., sub-millimeter) fiber optic lasers exhibiting single-frequency and/or single-polarization mode operation with wide mode separation. These FFP lasers combine high-gain fibers in low-loss, high-finesse fiber ferrule resonance cavity configurations supported in low-loss ferrule alignment fixtures developed for use in FFP filters. FFP lasers incorporate rare-earth doped, sensitized glass fiber as active fiber within FFP cavities. FFP laser sources include fixed-frequency, discretely-tunable and continuously tunable sources. Fiber ferrule assemblies with single laser gain cavity configurations and multiple-cavity configurations are provided. FFP lasers are end-pumped using single- or double-pass pumping configuration as well as pump resonance cavity configurations. Ultra-short FFP lasers can be readily and conveniently combined with fiber amplifiers to increase fiber laser output power. Ferrule alignment fixtures afford simple, high-precision fiber alignment which is stable as a function of cavity tuning and over reasonable device operating temperatures. Wavelength tuning is achieved by controlled temperature variation of gain cavity length or by electromechanical variation of laser gain cavity length. The inventive lasers have good environmental stability and are compact for convenience of device packaging and thermal control.

Tunable, single-frequency FFP lasers at 1535 nm employing high-gain erbium:ytterbium phosphate glass fiber or high-gain erbium:ytterbium phospho-silica glass fiber are specifically provided. Single-frequency and/or single-polarization mode erbium:ytterbium glass FFP lasers, having cavity lengths less than about 200 μm with continuous wavelength tuning range over several nanometers are provided. Amplified single-frequency lasers incorporating rare-earth ion doped fiber amplifiers are also provided. Single-frequency lasing employing sub-millimeter lengths of rare-earth doped sensitized fiber in a three-mirror laser configuration is demonstrated.

BRIEF DESCRIPTION OF THE DRAWINGS

FIG. 1 is a schematic diagram of a fiber optic laser system with optional fiber amplifier.

FIG. 2 is an exemplary FFP laser ferrule assembly having a two-mirror configuration.

DETAILED DESCRIPTION OF THE INVENTION

Figure 3:
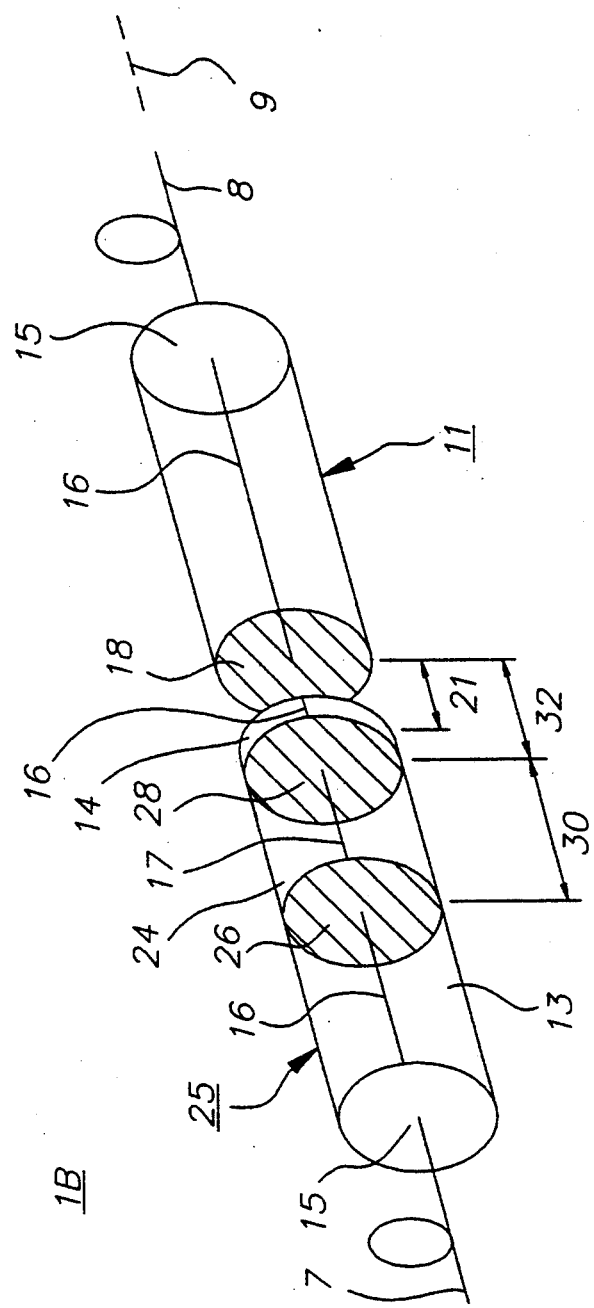
FIG. 3 is an exemplary FFP laser ferrule assembly having a three-mirror configuration.

To achieve lasing with sub-millimeter fiber cavity lengths, the laser gain cavity (i.e., FFP resonator) must have low loss. For a single cavity fiber laser system the following equation represents the minimum active fiber length ($l_m$) required for lasing:

$$l_m = \frac{-1}{2\sigma_e A} \ln[R_1 R_2 (1 - L_R)]$$

where $\sigma_e$ is the effective stimulated-emission cross-section of the fiber (in m$^2$), A is the emitting dopant concentration in the fiber (in m$^{-3}$), $R_1$ and $R_2$ are the input and output mirror reflectivities and $L_R$ is the round-tip cavity loss which accounts for absorption in mirror coatings diffraction loss, and misalignment of the fibers in the cavity. The higher the fiber gain, the higher the reflectivity and the lower $L_R$, the shorter the length of fiber needed for lasing. Decreasing the length of the laser gain cavity results in more stable single-mode laser operation, increased spectral purity, larger FSR and wider tuning ranges for tunable lasers. Active fiber gain is a function of $\sigma_e$ and A, as well as a function of pump efficiency. Pump absorption in the active fiber, particularly rare-earth ion-doped active fibers can be significantly enhanced by addition of codopants which act as sensitizers absorbing pump photons and transferring energy to the emitting species, e.g. the rare-earth ion.

The sub-mm FFP laser gain cavities of this invention are fabricated in fiber ferrule assemblies, which were developed for use in FFP filters. Specifically, techniques employed to fabricate wafered ferrules as described in U.S. Pat. No. 5,212,746 are used to fabricate sub-mm active cavities. These techniques allow highly precise construction of ultra-short FFP laser cavities which can be conveniently and reproducibly aligned in low-loss, ferrule alignment fixtures. The ferrule alignment fixtures used provide a means for adjusting cavity alignment and if necessary or desirable can be temperature compensated. Changes in ambient temperature can significantly effect resonance cavity length and output wavelength in FFPs. In temperature compensated devices wavelength drift as a function of temperature is minimized. Alignment fixtures can also provide a means for tuning fiber laser output. Certain fixtures are tunable by temperature control (i.e., heating or cooling). Other fixtures provide a means for electromechanically changing the cavity length, for example by use of piezoelectric transducers (PZTs). Tuning using PZTs is preferred for applications requiring broad tuning range. The alignment fixtures described herein for use in sub-mm fiber lasers can achieve round trip loss of 0.002 or less and exhibit relatively low loss as a function of tuning.

The fiber ferrule assemblies with the alignment fixtures of this invention can be combined to generate high finesse resonance cavities. Finesse up to 4000 can be obtained with techniques described.

Four factors have been identified as important for producing preferred low-loss, high-finesse laser gain cavities for ultra-short FFP lasers. The use of low-loss $TiO_2/SiO_2$ multiple dielectric layers for mirrors; high precision polishing of fiber ends to achieve high precision fiber end perpendicularity to the fiber core (preferably 0.02° or less); high precision alignment and bonding in ferrule construction; and accurate, thermally stable fiber gap tuning.

The fiber optic lasers of this invention are described in more detail by reference to the drawings.

FIG. 1 schematically illustrates an exemplary FFP laser system of this invention. The fiber laser gain cavity (1) is formed within a fiber Fabry-Perot (FFP) ferrule assembly supported within a low-loss, high-finesse alignment fixture. A pump laser (2) appropriately coupled to the optical fibers of the laser gain cavity provides pump energy of wavelength $\lambda_p$ to the cavity. In the configuration shown the laser cavity is end-pumped. Pump output is introduced into the cavity after passage through a wavelength isolator (3) and a wavelength division multiplexer (4) which prevent feedback of pump radiation and laser output to the pump laser. The pump wavelength is chosen as is well-known in the art in view of the absorption spectrum lasing material in the laser cavity. Absorption at $\lambda_p$ causes population inversion in the lasing material to induce lasing. A portion of the pump energy is thus absorbed in the laser cavity. Laser output $\lambda_s$ exits the cavity along with residual pump radiation. Cavity output is passed through a second wavelength isolator (5) to isolate $\lambda_s$. The laser output is then available for use in any desired application. Optionally the residual pump power at $\lambda_p$ and the laser output are passed into an optical amplifier (6), which absorbs residual pump power, preferably a fiber optical amplifier, as is well-understood in the art, resulting in amplification of the laser output at $\lambda_s$. The amplified laser output is likewise isolated from any residual pump energy at isolator 5. Those of ordinary skill in the art will appreciate that the fiber laser output generated after 1 or the amplified output generated after 6 can be adapted for use in a desired application by means other than those specifically detailed in FIG. 1. The components of the fiber optic laser system of FIG. 1 are optically coupled using low-loss fiber splicing and coupling techniques well-known in the art. Multi-mode conversion of the pump wavelength in the input connectors should be minimized. In particular, where possible fiber having a cutoff at shorter wavelengths than the pump wavelength should be employed.

FIGS. 2 and 3 illustrate exemplary fiber ferrule laser cavity configurations (1A and 1B) of this invention. FIG. 2 exemplifies a two-mirror cavity assembly 1A. The fiber ferule assembly has two ferrules, a mirror-ended ferrule 11 and a wafered ferrule 12 composed of ferrule 13 aligned with and bonded to wafer 14. The ferrules 11 and 13 and wafer 14 are typically cylinders each having an essentially axial bore 15 through which stripped optical fiber (16) or active fiber (17) is threaded. The longitudinal axis (9) of the ferrule assembly is indicated. The fiber is fixed within the axial bore with an appropriate adhesive, e.g. an epoxy adhesive. The mirror-ended ferrule and the wafered ferrule serve as fiber termini, with fiber ends at their internal ends and fibers (7 and 8) extending from their external ends. At the internal end of each ferrule the fiber is cut flush with the ferrule end face and that end face is polished. Dielectric mirrors 18 and 19 are deposited on the polished ends of ferrules 11 and 13 covering the fiber ends. Wafer 14 is bonded to the mirrored end of ferrule 13 such that mirror 19 is embedded between the ferrule end and the wafer. The wafer is bonded to its ferrule using an adhesive that is substantially transparent to optical transmissions through the fiber, e.g., a UV-cured epoxy. Where possible it is preferred that adhesive layers, bonding ferrules and wafers are external to the resonance cavity to minimize losses in the cavity.

Active fiber 17 containing a lasing material is in the axial bore of the wafer. The length of the laser gain cavity is thus essentially the length of the wafer. The internal ends of ferrule 11 and wafered ferrule 12 are opposed and the fibers in the ferrules aligned to form FFP cavity 20, which is the laser gain cavity between mirrors 18 and 19. The ferrules are separated by a short fiber gap 21 the length of which can be fixed or tunable. The fiber gap, which can be an air gap or filled with an appropriate index-matching material, is within the laser gain cavity so that the laser gain cavity itself is tuned by changing the length of the fiber gap.

Ferrules 11 and 12 are aligned and held in alignment by a ferrule alignment fixture which will be discussed in detail below or can be directly bonded together to form a fixed cavity assembly. For tunable lasers this fixture comprises a means for electromechanically changing the length of the fiber gap to tune the wavelength of the laser output.

FIG. 3 illustrates a three-mirror configuration of a multiple-mirror fiber laser gain cavity configuration. This ferrule assembly contains a mirror-ended ferrule 11 with mirror 18 and a multi-wafer ferrule 25. The multi-wafer ferrule has two wafers 14 and 24 and two embedded mirrors 26 and 28. In the exemplified configuration, the fiber laser gain cavity 30, i.e., the active cavity containing 17 is in the multi-wafer ferrule between mirrors 24 and 28. A passive cavity 32, having a fiber gap 21 is formed between mirrors 18 and 26. Note that a longer cavity containing active and passive regions is formed between mirrors 24 and 28. The laser of FIG. 3 is discretely tuned by changing the length of the passive cavity. Wafers are bonded to other wafers and ferrules using adhesive substantially transparent to optical transmissions through the fiber. Where possible adhesive joints are external to the resonance cavity. Multiple cavity ferrule configurations having more than one active cavity can also be used in the FFP lasers of this invention. For example, both cavities in the three-mirror configuration of FIG. 3 can include active fiber. Single-frequency laser operation with discrete wavelength-tuning is possible with the multiple-mirror fiber designs like that of FIG. 3. The theory and operation of multiple cavity tuning is well understood in the art. See: A. E. Siegman, (1986) *Lasers*, University Science Books, Mill Valley, Cal.; G. P. Agrawal and N. K. Dutta (1986) *Long Wavelength Semiconductor Lasers*, Van Nostrand Rheinhold Comp., New York.

Ferrule assemblies for fixed-wavelength FFP laser operation can be constructed by rigidly bonding aligned ferrules together to form the fiber laser gain cavity. For example, the internal ends of a mirror-ended ferrule and a wafered ferrule with embedded mirror can be directly bonded together to form such a fixed length laser gain cavity. Prior to bonding, the fibers in the opposed ferrules are aligned, for example in a rotary mechanical splice fixture using the rotary alignment technique as described in U.S. Pat. Nos. 4,545,644 and 5,212,745. Bonding of such assemblies is preferably done with UV-curable epoxy applied at the ferrule joint before alignment which is cured after the fibers are aligned to bond the ferrules in alignment. The bonded ferrule assembly is removed from the rotary mechanical splice. Alignment fixtures are not required for these bonded assemblies. Fixed cavity FFP lasers having bonded ferrule assemblies can be wavelength tuned by changing the temperature of the ferrule assembly to change the length of the laser gain cavity.

The multi-wafer ferrule in constructed essentially as is a wafered ferrule. After the first wafer is bonded to the mirror-ended ferrule to form the first embedded mirror, the non-bonded end of the first wafer is polished to produce a highly parallel face to which a second mirror-ended ferrule is bonded. The second wafer is formed by cutting or grinding the second mirror-ended ferrule.

Ferrules are typically drawn glass, such as Pyrex TM or quartz, or may be fabricated from ceramic. Wafered ferrules are prepared by (alignment and) bonding of fiber ferrule with a mirror-ended fiber ferrule after which the mirror-ended ferrule is shortened to form the wafer by cutting and/or grinding. Typically wafers can be readily prepared in lengths from about 5 $\mu$m to several millimeters. For applications to fiber optic lasers of this invention, wafers ranging from about 5 $\mu$m to about 1 mm are presently of most interest. Construction of ferrules and wafered ferrules is described in detail in U.S. Pat. Nos. 5,212,745 and 5,062,684 which are incorporated by reference in their entirety herein. For application to the preparation of FFP laser cavities of this invention it is important that the opposing ends of the ferrules and/or wafers forming the resonance cavity are polished to be essentially parallel. It is also important that fiber ends are polished to be essentially perpendicular to the fiber core axis. The degree of perpendicularity is preferably within about 0.02° and more preferably within about 0.01°.

In general any means for integrally forming a low-absorption, high-reflectivity mirror on a ferrule can be employed in the FFP lasers of this invention. Low-loss FFPs can be constructed with mirrors formed by deposition of multiple dielectric layers, such as $Si/SiO_2$ layers. Improved low-loss mirrors are formed by deposition of $TiO_2/SiO_2$, as described in J. Stone and L. W. Stulz (1991) Electronics Letts. 27(24):2239-40. Those of ordinary skill in the art appreciate that mirror reflectivity varies as a function of wavelength. The mirrors that form the laser gain cavity require high reflectivity at laser output wavelengths ($\lambda_s$) and for single- and double-pass pumping configurations should substantially transmit the pump wavelength ($\lambda_p$). Pump resonance cavity pumping configurations require mirrors the reflect at $\lambda_p$ forming a pump resonance cavity including the laser gain cavity. Techniques well-known in the art can be used to select mirrors with reflectivity appropriate for various combinations of $\lambda_s$ and $\lambda_p$.

The use of index matching material in fiber gaps is optional in FFP lasers. It should be determined empirically in a particular device design for a particular application whether or not the use of index matching material is beneficial to achieving desired laser output.

In general any type of high gain active fiber, emitting at any wavelength, can be adapted by choice of pump laser, non-active fiber and mirrors for use in the ferrule assemblies described herein to form a laser. Those active fibers with gain high enough to support lasing in a fiber length less than about 1 millimeter can be readily adapted for the FFP lasers herein. More specifically, high gain fibers, particularly any rare-earth doped fibers with gain comparable to Er:Yb codoped fibers as exemplified herein can readily be adapted for the FFP lasers herein. Active fibers particularly suited for use in the FFP lasers high gain doped with rare-earth ions including among others neodymium and holmium.

It will be appreciated by those in the art that high gain Er fibers with $\lambda_s$ about 1.5 nm can be generated by inclusion of sensitizers other than Yb and in host glass other than phosphate glass and phospho-silica glass.

Ferrule alignment fixtures provide a support means for holding and securing the ferrule elements of the ferrule assembly such that the fibers of the ferrules are aligned to allow optical transmission through the ferrule assembly. The fibers are preferably aligned to maximize transmission through the assembly. In general, an alignment fixture has a means for receiving ferrules or wafered ferrules, such as a passage within the body of the fixture, so that the internal ends of the ferrule elements can be opposed and the fibers therein can be aligned to form the laser gain cavity. The alignment passage itself is constructed to high tolerance and can be formed, for example, by high precision machining through a fixture body to result in a substantially smooth, substantially straight passage which will accommodate cylindrical ferrule assembly elements. The passageway can be shaped as described below to provide multi-point contact, preferably three-point contact, between the ferrule and passageway. The alignment fixture provides a means for adjusting the relative alignment of the fibers in the ferrule assembly. To achieve a low-loss laser gain cavity, high precision alignment of the optical fibers through the cavity is required.

Exemplary alignment fixtures suitable for use in the fiber optic lasers of this invention include those described in U.S. Pat. Nos. 5,212,745, 5,289,552, and pending U.S. patent application Ser. Nos. 08/135,679 (now allowed, but not issued) filled Oct. 13, 1993 and 08/161,702 (still pending), filed Dec. 3, 1993.

Figure 4:
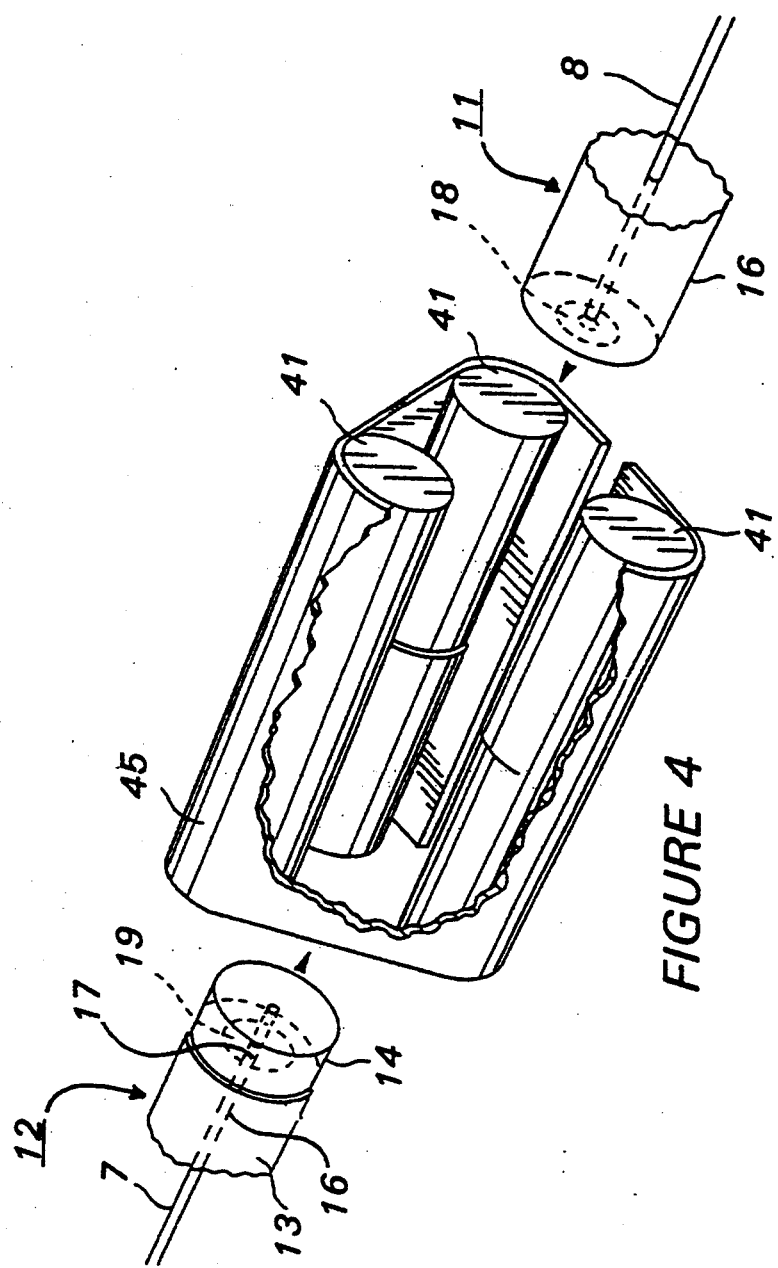
FIG. 4 is a partial cut-away view of a ferrule low-loss, high-finesse alignment fixture useful particularly for fixed frequency FFP lasers. The view indicates introduction of the ferrules of a ferrule assembly of FIG. 2 onto the fixture.

A rotary mechanical splice alignment fixture, as illustrated in FIG. 4, can be employed for fixed-wavelength or for temperature tuning of the FFP lasers of this invention. This fixture was described in U.S. Pat. No. 4,545,644, with particular reference to FIG. 3 therein, for use in fiber splicing. A detailed description of its construction and operation is given in U.S. Pat. No. 4,545,644 which is incorporated, in its entirety, by reference herein. U.S. Pat. No. 5,212,745 describes the use of the rotary mechanical splice for use in fixed and temperature-tunable FFPs and is also incorporated by reference in its entirety herein.

The rotary mechanical splice comprises a plurality of, preferably three, alignment rods (41, 41' and 41") held within a spring bracket 45. The essentially cylindrical alignment rods are shown in the three corners of the triangular spring bracket. The alignment rods provide multi-point, preferable three-point, support for ferrules 11 and 12 inserted into the passage formed by the alignment rods. The ferrules are inserted into the rotary mechanical splice, the spacing between the internal ends of the ferrules is adjusted to form a gap, i.e. a fiber gap, which is adjusted to maximize emission of a desired wavelength. The gap also allows for variations in the cavity length, e.g. as a function of temperature change. The gap is small, typically about 1 $\mu$m, but preferably not more than about 3 $\mu$m, since diffraction loss increases with increasing gap size. The gap can be filled with an index matching material. At least one of the rods, preferably two in a three-rod splice, includes a "flat" as defined in U.S. Pat. No. 4,545,644, extending along the rod from one end for a substantial fraction of the length of the rod.

In the fixture of FIG. 4, alignment rods 41 and 41' carry flats. Ferrule 11 contacts the flat of alignment rod 41 and ferrule 12 contacts the flat of alignment rod 41'. Typically, the flat extends over about one half of the length of the rod, but unsymmetrical rods will function equivalently. Ferrule assembly elements, including two ferrules and/or wafered ferrules are inserted into the splice and aligned therein essentially as described for insertion and alignment of capillary cylinders in U.S. Pat. No. 4,545,644. The spring bracket 45 holds the ferrule assembly elements in rigid contact with the alignment rods which constitute the body of the fixture. For operation of the rotary mechanical splice for alignment, an inserted ferrule must be in rigid contact only with the flat portion or the cylindrical portion of any one alignment rod.

The outside diameter of the wafer 14 of the ferrule can be made smaller than that of the ferrule to which it is bonded to avoid rigid contact between the wafer and the body of the alignment fixture.

The rotary alignment technique as described in U.S. Pat. No. 4,545,644 requires an alignment fixture offset. This feature increases the offset between the fiber axes of the two ferrules in the fixture. This feature is introduced in the rotary mechanical splice ferrule alignment fixtures to facilitate rotary alignment of ferrules.

In the fiber optic laser of FIG. 4, the laser gain cavity is fixed by the wafer length and gap length. The wavelength emitted by the laser can be tuned by selectively varying its temperature causing the ferrule assembly and splice fixture to expand or contract and changing the length of the laser gain cavity. As described in U.S. Pat. No. 5,212,745 for temperature tuning of FFPs, resistive heating elements or thermoelectric heater/-coolers placed in thermal contact with the FFP laser can be used for temperature tuning. Alignment fixtures that are useful in temperature tunable FFP lasers allow the length of laser gain cavity to vary with temperature without substantial detriment to axial alignment of the ferrule assembly.

Ferrule alignment fixtures for use in tunable FFP lasers can also comprise a means for electromechanically changing the length of the laser gain cavity. FIGS. 5, 6 and 7 provide exemplary ferrule alignment fixtures in which piezoelectric transducers (PZTs) are used to change cavity length.

Signal loss due to wavelength drift and increased fiber misalignment as a function of temperature can be a significant problem in FFPs. Stacked PZTs such as those used in the lasers of FIGS. 5–7, require higher voltages at higher temperatures to achieve the same change in length and thus effectively have a large negative temperature coefficient. A PZT-tuned FFP laser will exhibit wavelength drift as a function of temperature reflecting the aggregate longitudinal temperature coefficient of the ferrule assembly and alignment fixture including the negative temperature coefficient of the PZTs. An uncompensated FFP, like that of U.S. Pat. No. 5,062,684 or EP application 0 457 484, can exhibit a relatively large change in cavity length with temperature, of the order 0.05 $\mu m/°C$. which can represent drift of a full FSR over 15° C. While it is possible to employ wavelength locking techniques as described in C. M. Miller and F. J. Janniello (1990) Electronics Letters 26:2122–2123; I. P. Kaminow (1987) Electronics Letters 23:1102–1103 and D. A. Fishman et al. (1990) Photonics Technology Letters pp.662–664 to prevent significant signal loss from wavelength drift with temperature, high voltage power supplies, i.e., +/−60 volts, are required to achieve wavelength control over a reasonable temperature range unless FFPs are temperature compensated. Temperature compensated FFP designs are preferred for use in wavelength-tunable fiber lasers of this invention. The alignment fixtures of FIGS. 5–7 combine means for passive temperature compensation, i.e. balancing temperature coefficients by choice of materials, and means for adjusting the temperature coefficient of the FFP laser after it is constructed.

Figure 5A:
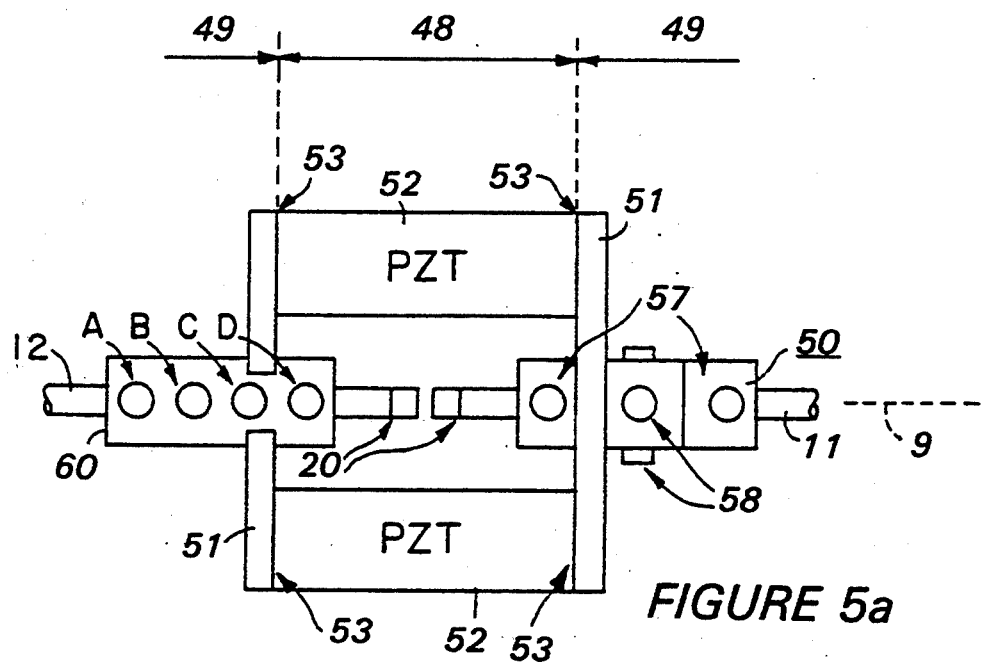
FIG. 5A is a schematic representation of an exemplary low-loss, high finesse, temperature compensated ferrule alignment fixture useful for constructing fiber optic lasers of this invention. A FFP laser ferrule assembly of FIG. 2 is shown in place within the fixture. This fixture is described in U.S. Pat. No. 5,289,552.

FIG. 5A is a schematic drawing of a PZT-tuned temperature compensated FFP laser. The laser has an alignment fixture composed of two ferrule holders or supports (50) and (60) connected to each other by a bridge of brackets (51) extending outwardly from the holders and bridging PZTs (52). Ferrule holder 50 has a means for adjusting the relative alignment of the ferrules in the filter, while the second ferrule holder 60 provides a means for adjusting the temperature coefficient of the laser after it is constructed. The fiber laser of FIG. 5A also has the passive temperature compensation feature of using controlled epoxy layers at the joints (53) between PZTs 52 and brackets 51 which compensates for the high negative temperature coefficient of the PZTs.

Figure 5B:
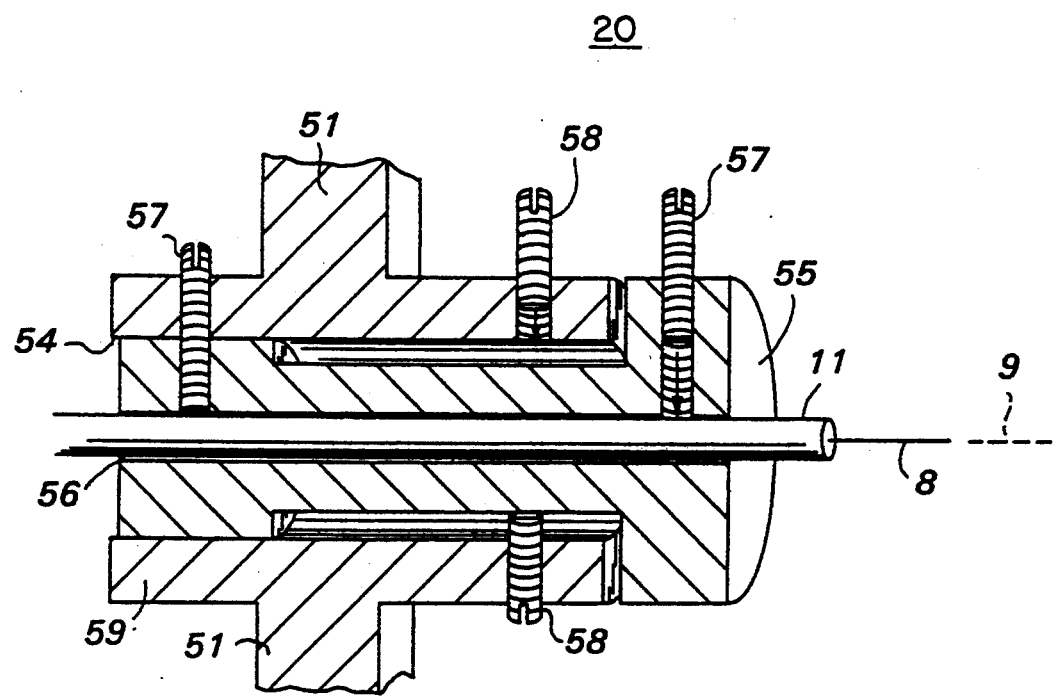
FIG. 5B is a longitudinal cross-sectional view of a ferrule holder of the fixture of 5A that provides a means for adjustment of the relative axial alignment of the ferrules in the fixture.

FIG. 5B is a cross-sectional view of the ferrule holder 50 of the fixture of FIG. 5A. This ferrule holder has a substantially cylindrical passageway (54) in the holder body (59) for receiving a stepped sleeve (55) with passage (56) into which the ferrule is received. Mounting screws (57) traverse the body of the holder and the sleeve to directly contact the ferrule within the passageway and secure it within the fixture. Alignment screws (58), typically four, are symmetrically disposed around the longitudinal axis (9) of the fiber laser.

Figure 5C:
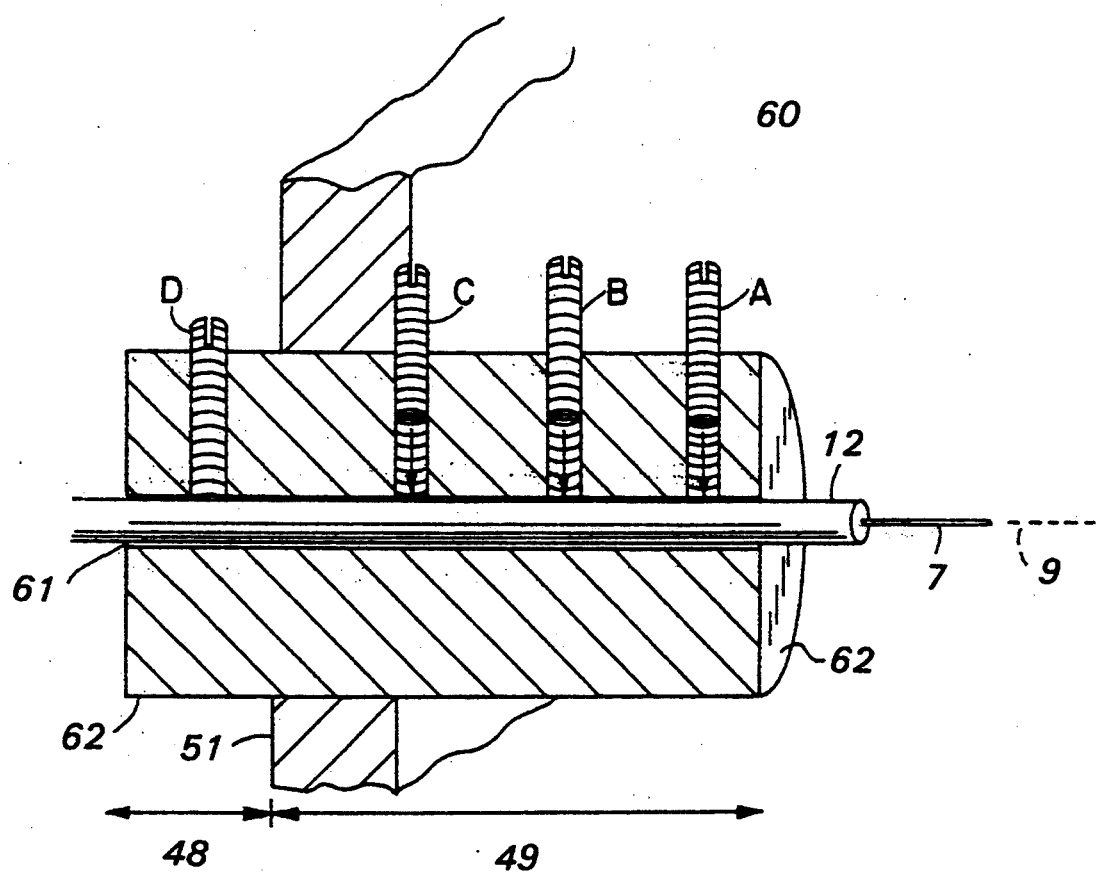
FIG. 5C is a longitudinal cross-sectional view of the other ferrule holder of the fixture of FIG. 4A which provides a means for adjusting the temperature coefficient of the laser cavity by changing the points of contact between the ferrule and the holder passageway.

FIG. 5C is a cross-sectional view of the second ferrule holder 60 of the fixture of FIG. 5A. A substantially cylindrical passageway (61) for directly receiving the ferrule (12) extends along the longitudinal axis (9) of the fixture. A plurality of mounting screws A, B, C, D (four are shown) traverse the holder body (62). When tightened the mounting screws enter passageway 61 to contact the ferrule holding it securely within the holder. Mounting screws extend along the length of the holder preferably entering the passage from the same direction. As shown in FIG. 5A, the joints between brackets 51 and PZTs 52 define an inboard region (48) and outboard regions (49 and 49') of the fixture. There is thus, as indicated in FIG. 5C, an inboard region (48) of the ferrule holder inside of the brackets and an outboard region of the ferrule holder outside of those brackets (49).

The means for adjustment of wavelength drift, i.e. adjustment of temperature compensation, in the alignment fixture of FIG. 5A comprises a means for varying the contact points between the ferrules and the ferrule holder along the passageway. At least one contact point is in the inboard region of the holder and at least one contact point is in the outboard region of the holder. In general, means are provided in a holder for a plurality of contact points with the ferrule. A holder preferably has means for making more than two contacts with the ferrule within the holder. The ferrule holder exemplified in FIG. 5C has four mounting screws, which define four contact points with the ferrule. Three of the mounting screws (A, B, C) are in the outboard region and one mounting screw (D) is in the inboard region. Changing the position of the contacts points between the ferrule and the holder body increases or decreases the amount of positive temperature coefficient material that contributes to the overall cavity length temperature coefficient of the filter.

A FFP laser like that of FIG. 5A, is constructed as described in U.S. Pat. No. 5,289,552 for FFPs by first determining the amount of positive temperature coefficient adhesive required to balance the negative temperature coefficient of the PZTs. This is done in a test filter as described therein. The amount of adhesive is readily controlled by controlling the thickness of the adhesive layers between the ends of the PZTs and the brackets of the holders using gauge wires of precise known diameter. Epoxy layers were controlled by use of substantially non-deformable steel gauge wire spacers inserted between the surfaces to be bonded (PZT ends and holder bracket faces). The required thickness of the epoxy layers was determined with all mounting screws of holder 60 tightened in contact with the ferrule. The epoxy thicknesses determined in the test device are then used to construct other FFP devices of the same design, size and materials. Once a FFP laser with controller epoxy thicknesses is constructed wavelength drift can be minimized by adjustment of the contact points with the ferrule. Details of passive temperature compensation and adjustment of temperature coefficients of FFPs are provided in U.S. Pat. No. 5,289,552, and all generally apply to temperature compensation of FFP lasers.

Figure 6A:
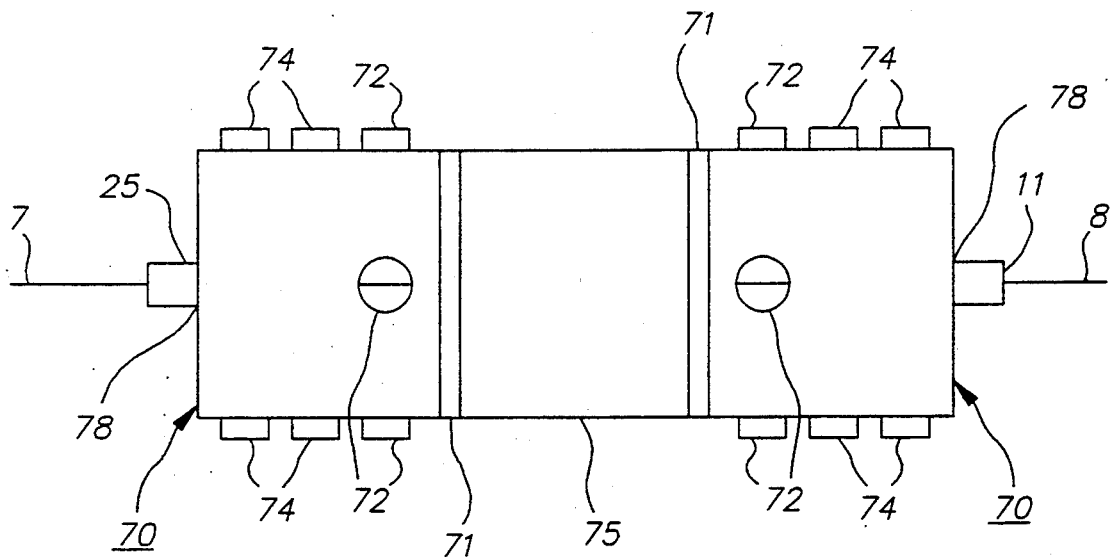
FIG. 6A is a schematic representation of a second exemplary low-loss, high finesse, temperature compensated ferrule alignment fixture useful in the construction of fiber optic lasers of this invention. A FFP laser ferrule assembly of FIG. 3 is shown in place within the fixture. This fixture is described in U.S. patent application Ser. No. 08/135,679 (now allowed, but no issued), filed on Oct. 13, 1993. The ferrule holders have one set of four screws around the holder for alignment and a series of screws in line along the length of the holder to provide temperature compensation.

A second exemplary ferrule alignment fixture with PZT wavelength tuning and temperature compensation is illustrated in FIG. 6A. This alignment fixture was described in U.S. patent application Ser. No. 08/135,679 (now allowed, but not issued) filed Oct. 13, 1993, which is incorporated in its entirety by reference herein. Two identical ferrule holders (70) are connected to a cylindrical PZT (75) by controlled thickness epoxy layers (71). The ferrule holders have one set of four screws (72) for alignment and a series of screws (74) in line along the length of the holder to provide temperature compensation. The screws also function to secure the ferrules (11 and 25) within the holder passageway. Screws 74 are adjusted to achieve desired alignment. The remaining screws 72 are tightened or loosened as necessary to achieve a desired temperature compensation.

Figure 6B:
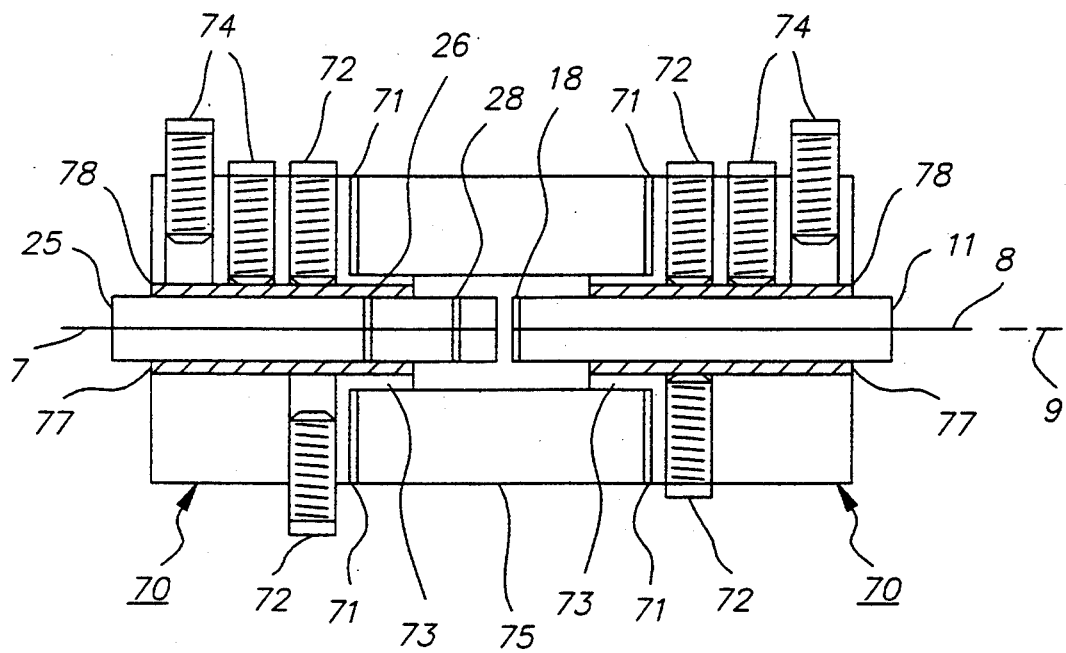
FIG. 6B is a longitudinal cross-sectional view of the alignment fixture of FIG. 6A.

FIG. 6B is a cross-sectional view of the fiber laser of FIG. 6A showing the position of a three-mirror ferrule assembly within the filter. In this case, a multiple wafer ferrule (25) is combined with a mirror-ended ferrule (11) to form the optical cavity. A sleeve (77) is interposed in the passageway (78) of the holder such that the screws (72 and 74) contact the sleeve which in turn contacts the ferrule. The internal end of the holder is bonded to the end of the single cylindrical PZT (75) and the passageways in the PZT and the holders are aligned so that the internal ends of the ferrules can be inserted into the holders and extend into the PZT. Application of an electric field across the PZT causes it to elongate longitudinally and thereby increase the optical cavity length. The internal end of each holder has a flange (73) around the circumference of the internal exit of the holder passageway. This flange is designed to fit inside the passageway of the PZT to keep adhesive out of the optical cavity. Epoxy thickness is controlled by the use of gauge wires as described in detail in U.S. Pat. No. 5,289,552.

Figure 6C:
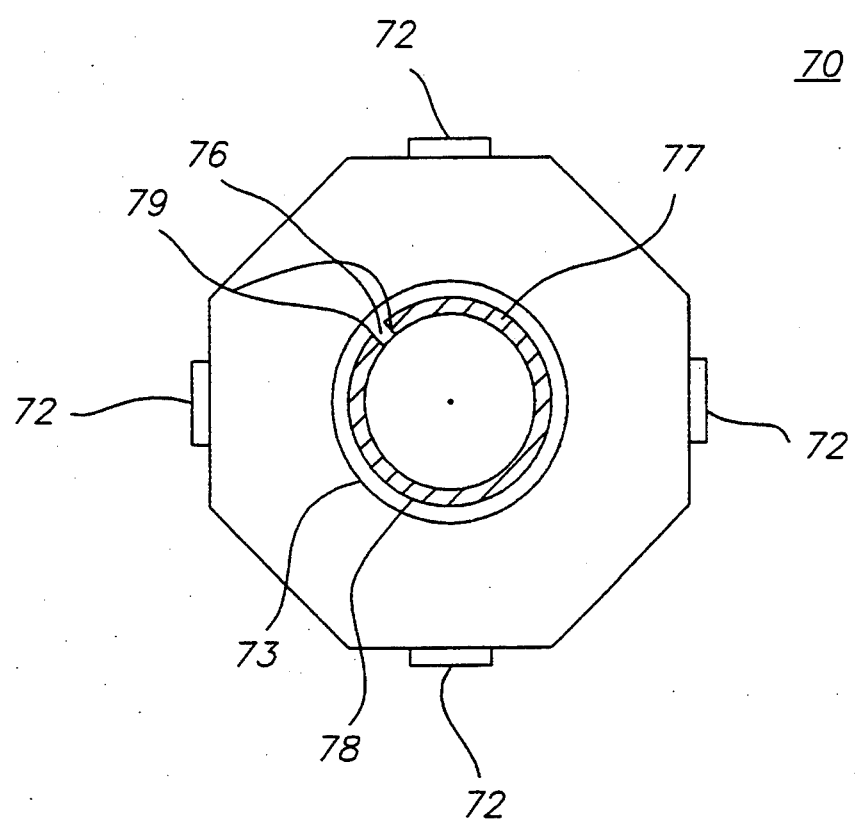
FIG. 6C is a radial cross-sectional view of an internal end of a ferrule holder of the fixture of FIG. 6A with a slotted sleeve in place such that the keyway of the holder is engaged in the slot in the sleeve. The flange which extends outwardly from the holder body is indicated.

FIG. 6C is a view of the internal end of a ferrule holder 70. This view shows a keyway (76) which extends the length of the holder passageway. The sleeve (77) is slotted along its length so that the when the sleeve is in place in the passageway the keyway of the holder is engaged in the slot in the sleeve. The slotted sleeve (77) is shown in place with its slot (79) engaged in the keyway (76). Flange (73) is shown extending outward from the holder body around the holder passageway (78).

The screws 72 and 74 in holder 70 are preferably sealed with a silicon thread sealer to keep moisture out of the FFP. Screws employed are typically made of the same material as the holder, preferably stainless steel. Screws with cupped-ends which tightly grip the surface against which they are tightened are preferably employed for alignment while screws with flat ends are preferably employed as screws 74 for creating contact points along the length of the holder passageway.

Screws 72 and 74 do not make a direct contact with the glass ferrule in holder 70. Sleeve 77 is inserted in each holder around the circumference of the ferrule. The screws contact the sleeve which in turn contacts the ferrule to secure it within the holder. The sleeve is employed to distribute the load on the glass due to tightening the screws. A phosphor bronze sleeve of the type typically used in fiber optic connectors was initially employed. The use of the sleeve in the FFPs significantly decreases ferrule breakage, particularly in miniaturized configurations. The sleeve provides an unexpected advantage for temperature compensation since finer adjustment of the temperature coefficient was possible. The interposition of the bronze sleeve between the stainless steel holder/screws and the glass ferrule functions to reduce the effect of each screw change on the overall temperature coefficient of the filter. This effect is believed to be attributable in part to the significantly higher positive temperature coefficient of bronze ($19 \times 10^{-6}/°C$.) compared to that of stainless steel ($10.3 \times 10^{-6}/°C$.) used in the holder. Metals having similarly high positive temperature coefficients and suitable mechanical properties are suitable for sleeves in the holder of FIG. 6B.

Alignment of one or both ferrules can be adjusted for example by tightening or loosening screws 72 within a set of screws positioned equiangularly around the circumference of the holder passageway. The screws are tightened or loosened with respect to each other to achieve maximum signal through the filter.

Figure 7A:
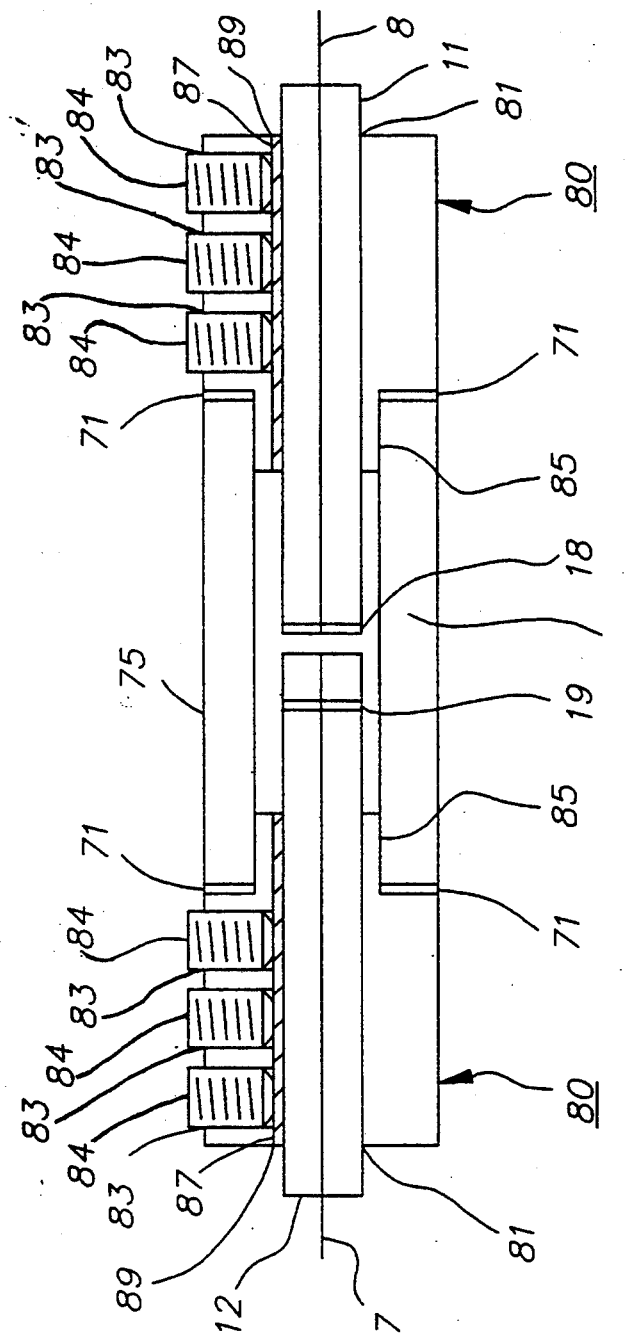
FIG. 7A is a longitudinal cross-sectional view of a third exemplary low-loss, high finesse, temperature compensated ferrule alignment fixture useful in the construction of fiber optic lasers of this invention. The FFP laser ferrule assembly of FIG. 2 is shown in place within the fixture. This fixture is described in U.S. patent application Ser. No. 08/161,702 (still pending), filed on Dec. 3, 1993.

FIG. 7A illustrates a preferred alignment fixture for fiber lasers of this invention. This fixture has general features in common with the fixture of FIG. 6A and is described in U.S. patent application Ser. No. 08/161,702 (still pending), filed Dec. 3, 1993 which is incorporated by reference in its entirety herein. The fixture has two ferrule holders (80) bonded on either side of a cylindrical PZT (75) so that the FFP laser gain cavity is formed within the passage way through the PZT. A distinct and important feature of the ferrule holders of the fixture of FIG. 7A is that the fibers in the ferrule assembly can be aligned in the fixture using an incremental rotary alignment technique, such as that used in alignment of rotary mechanical splice fixtures as described in U.S. Pat. Nos. 4,545,644 and 5,212,745. Holder 80 has a unitary body with a ferrule passageway (81) shaped to provide three-point contact between the holder and a ferrule around the circumference of the ferrule. Shaping of passageway 81 to achieve this three-point contact is illustrated in the radial cross-section of FIG. 7B.

Figure 7B:
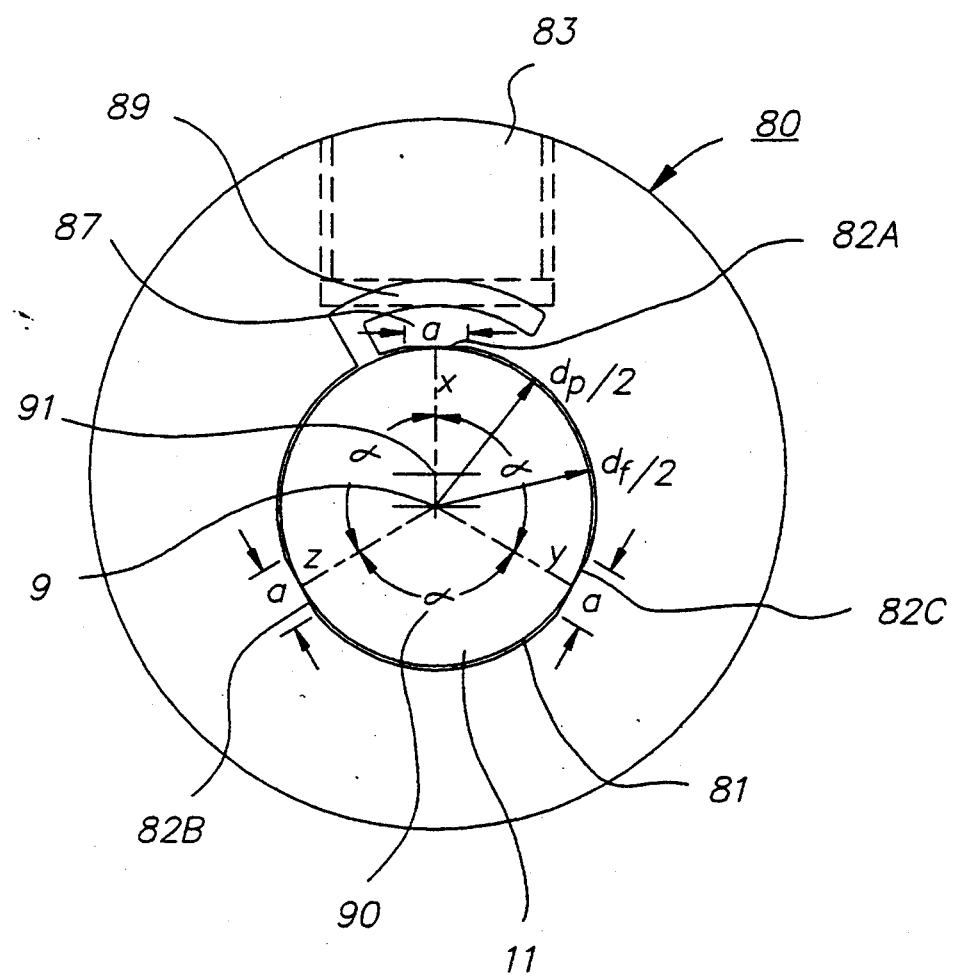
FIG. 7B is a radial cross-sectional view of the ferrule alignment fixture of FIG. 7A showing an exemplary holder passageway shaped for three-point contact. The ferrule retention means is a resilient arm extending from the body of the holder.

In the ferrule holder of FIG. 7A, passageway 81 extends the length of the holder and the means for securing a ferrule in the holder is a plurality of tapped holes (82 with screws 83), three screws are shown, in a line along the length of the holder. A ferrule retention means 87 is intermediate between the bottom of tapped holes 30 and passageway 81. An exemplary ferrule retention means is shown in FIG. 7B. Holder 80 also has a means for receiving a PZT, flange 85, at the internal longitudinal end of the holder around the circumference of the internal exit of the holder passageway. This flange is designed to fit inside the passageway of the PZT 75 to keep adhesive out of the optical cavity. The outer diameter of the flange is thus sized to receive a cylindrical PZT. The flange is inserted into the cylindrical passageway along the axis of the PZT. Cylindrical PZTs elongate along this longitudinal axis.

FIG. 7B is a radial cross-section of holder 80 illustrating a preferred shaped passageway (81) with ferrule 11 in place. In general passageways are shaped to include three-substantially flat regions so that the ferrule can be secured therein at three points of contact around the circumference of the ferrule. The illustrated passageway is substantially cylindrical having relatively short flats (82A, 82B and 82C) for contacting the ferrule. This design is preferred for stability of alignment. The flats of width (a) are preferably equiangularly and symmetrical arrayed around the passageway. The angle $\alpha$ (90) is preferably about 120°. The diameter of the passageway, $d_p$, is slightly larger than that of the ferrule, $d_f$ so that the ferrule can be inserted into the passageway without binding. Preferably the width a is selected such that $$a \geq 2\sqrt{d_p^2 - d_f^2}$$

The ferrule retention means shown in FIG. 7B is a resilient arm 87 is formed by extending a slot 89 outward from the holder passageway 81 under the bottom of the tapped holes. Flat contact 82A is on the inner side (toward the passageway) of this resilient arm. For convenience of machining the body, slot 89 which creates arm 87 can extend the entire longitudinal length of the holder body. Alternatively, a resilient arm can be positioned between the bottom of each screw hole along the length of the passageway. Three-point contact between the ferrule and the passageway along the length of the ferrule is secured by tightening a screw, preferably a cupped screw, into a tapped hole 30. The end of the screw contacts the outer side of the resilient arm 87, displacing it downwardly to contact the ferrule in the passageway. As a result of the downward force applied through the screw the ferrule also contacts the passageway at 82B and 82C. The axis of passageway 81 (9) is optionally displaced from the axis of the holder body (91) to provide additional room for tapped holes.

It will be appreciated by those of ordinary skill in the art that many variations of shaped passageways can be employed to achieve the desired three-point contact with the ferrule. It will also be readily apparent that the passageways can be shaped such that an inserted ferrule will make more than three contacts at flats therein. Such multi-point contact schemes which incorporate a basic three-point contact scheme are within the scope of the present invention, but are not preferred.

Holder 80 can have alternate ferrule retention means, for example a separate element or channel retained in position intermediate between the bottom of the tapped holes 30 and the ferrule in the passageway. The various ferrule retention means described in U.S. patent application Ser. No. 08/161,702 (still pending) can be employed in the FFP lasers of this invention.

Ferrules are aligned within the fixture of FIG. 7A by the iterative rotary alignment technique described in U.S. Pat. No. 4,545,644. It has been found empirically that PZT-tuned FFPs of FIG. 7A that there is no need to incorporate such a fixture offset to increase the offset between fiber axes in the FFP. Typically, there is sufficient fiber axis offset resulting from ferrule mismatch, variations in individually machined parts and variations resulting from bonding the holders to the PZT to allow the rotary alignment technique to be use. In the rare event that the fiber axes offset is not sufficient in an FFP, simply substituting one of the ferrules for another will generate the required offset.

Ferrule holders 80 can be fabricated from any material that will provide a durable rigid support for the ferrules. Various metals, such as stainless steel, can be employed. In general, passageway 81 are shaped by any high precision machining techniques appropriate for the material chosen. Low-expansion alloys can be difficult to machine, however, electron discharge machining techniques as are well-known in the art can be employed to introduce the desired shaped passageways, channels and slots in the inventive holders.

As discussed above, for many applications FFP lasers must be temperature compensated to minimize the undesired effect of ambient temperature changes on cavity length. In addition, temperature compensation minimizes the effect of ambient temperature changes on insertional loss, due to variation of alignment of fibers with temperature. Detriment to alignment is minimized in FFPs if the force on the ferrule within the holder remains substantially constant as a function of temperature.

In the PZT-tuned FFP lasers of FIG. 7A temperature compensation is achieved in part by the use of controlled thickness of positive thermal coefficient adhesive in the bonds between the holders and the PZT, as described above. Losses due to fiber misalignment with temperature is minimized in by choice of materials for the holder and its component parts. Ferrule holders are most preferably entirely fabricated from a material which has a thermal expansion coefficient equal to that of the material from the ferrules are constructed. Since ferrules are typically made from low-expansion glass like, Pyrex TM and quartz, low-expansion metal alloys, i.e. those having a thermal expansion coefficient of about 7.5 ppm/°C. or less are preferred materials for preparation of ferrule holders. Particularly suitable low-expansion alloys are those containing nickel and iron, such as Invar TM, ternary alloys of nickel, iron and cobalt, such as Kovar TM, or ternary alloys of iron, cobalt and chromium, such as Elinvar TM, all as described in M. A. Hunter (1961) Metals Handbook, American Society of Metals 8th Ed. (Taylor Lyman, ed.) Volume 1, p.816–819.

For example, a low-expansion alloy having a thermal expansion coefficient of about 3.6 ppm/°C. (the thermal expansion coefficient of Pyrex TM) would be most preferred for use with Pyrex TM ferrules. This is true, however, only if the entire holder including the screws can be fabricated from such a low-expansion alloy. These alloys are, however, difficult to machine. It is therefore difficult and expensive to prepare screws from many low-expansion alloys. Further, while it is possible to make an alloy with a desired low thermal expansion coefficient by variation of its component elements as described in Hunter (1961), supra, it is more efficient and less expensive to employ commercially available alloys, like Kovar TM or Invar TM.

Excellent temperature compensation of a PZT-tuned FFP laser of FIG. 7A using Pyrex TM ferrules can be obtained when the holder is made of Kovar TM and low-expansion stainless screws are used. The mismatch between the thermal expansion coefficient of Kovar TM (about 5 ppm/°C.) and Pyrex TM (3.6 ppm/°C.) was compensated by use of screws of higher thermal coefficient material (stainless steel of about 10 ppm/°C.). If an alloy of slightly lower expansion coefficient were employed for a holder for Pyrex TM ferrules, the desired balance would be obtained by using screws having a slightly lower expansion coefficient than stainless steel.

Such general principles can be used to select appropriate materials for ferrule holders and components to achieve temperature compensation. The temperature compensation achieved by any particular selection of materials for holders and screws can be readily tested as described in U.S. patent application Ser. No. 08/161,702 (still pending), filed Dec. 3, 1993. The techniques described therein for temperature compensation of fixtures like that in FIG. 7A is applicable to the FFP lasers of this invention.

In general, satisfactory temperature compensation of an FFP of FIG. 7A can be achieved if the ferrule holder body is fabricated of material having a thermal expansion coefficient within a factor of two higher or lower than that of the ferrule material. Over this range choices of materials for the ferrule retention element and or screws can be made to satisfactorily compensate for mismatches in thermal expansion coefficients of the body and the ferrules. Preferred ferrule materials for temperature compensated FFPs are those which have a thermal expansion coefficient that differs from that of the ferrule material by less than about 50%, e.g. for Pyrex TM ferrule holders made of materials having a thermal expansion coefficient between about 5.4 and 1.8 ppm/°C. are preferred.

Ferrule holders of the fixture of FIG. 7A can be adapted to provide an adjustable means for selectively changing the longitudinal thermal expansion coefficient of the filter as described for the holder of FIG. 5C and 6B, above. In ferrule holder 80 when the holder body is made of a material having a thermal expansion coefficient different from that of the ferrules, the ferrule retention element is made of a different material selected to compensate for the mismatch. Since the ferrule retention element extends the entire length of the ferrule under the plurality of adjustable screws, temperature compensation is adjustable by changing the points of contact with the holder body along the length of the ferrule.

The FFPs of this invention can employ any type of piezoelectric transducer means which transforms electrical energy into mechanical energy by utilizing the piezoelectric longitudinal effect. PZTs employed are preferably stacked PZTs. PZTs elongate on application of an electric field and the elongation is proportional to the applied field. In a stacked PZT about 10 mm long, as those exemplified herein, application of about 50 V to the PZT results in an elongation of about 2-3 $\mu$m. Electrostrictive materials which elongate on application of a field, but in which the elongation is proportional to the square of the applied field can also be employed in the FFPs of this invention to vary cavity length. Like PZTs, electrostrictive materials will display negative temperature coefficients, the effect of which can be compensated as described herein specifically for PZTs.

The FFPs herein can combine any means of passive temperature compensation with the means for adjustment of the temperature coefficient that is disclosed herein. The methods for passive temperature compensation described herein can be employed alone or in combination with the methods for adjustment of temperature drift described herein. Similarly, the methods and ferrule holders described herein for temperature coefficient adjustment in an FFP laser can be employed in the absence of passive temperature compensation, such as the use of aluminum blocks and/or controlled epoxy layers. It is most preferred in order to minimize drift and maximize production yield, to combine passive means and adjustable means described herein. The temperature compensated FFP lasers of this invention can be employed in combination with wavelocking circuity as is know in the art.

The ferrule alignment fixtures of FIGS. 6A and 7A can be miniaturized to have dimensions less than about 6.8 mm high, 10 mm wide and 30 mm long. Miniaturized FFP devices are useful in any application in which space is at a premium, and particularly useful for mounting on circuit boards.

As will be appreciated by those in the art, intensity losses in the fiber ferrule assemblies herein can be due to a number of factors including diffraction and absorption at the mirrors as well as to misalignment of the fibers. It will also be appreciated that obtaining a low-loss filter requires minimization of all such losses. Means for minimizing losses which are not the result of fiber misalignment within a resonance cavity are well-known in the art.

The FFP lasers exemplified herein all employ a single-pass pump scheme. Pump efficiency can be enhanced in these lasers by use of double-pass or pump resonance cavity pump schemes. Operation and implementation of such conventional pumping schemes are generally well-known in the art. Ferrule assemblies are particularly well suited for use with double-pass and resonance cavity pump configurations because the additional mirrors required for the pump configuration can be readily incorporated into ferrule assemblies using ferrule wafer bonding, grinding and polishing techniques. The pump source is chosen in view of the active fiber to provide $\lambda_p$ that will be absorbed in the active fiber to ultimately induce lasing. It will be appreciated that any particular lasing material may absorb at several different wavelengths. In such a case, different pump sources may be useful and the choice of a particular pump source will depend upon a number of factors including the strength of the absorption and the availability of stable lasers which emit $\lambda_p$. For example, Er-doped fibers can be pumped at 1490 nm or more preferably at 980 nm.

In the ultra-short cavity lasers of this invention, substantial pump power remains unabsorbed on passage through the active fiber of the laser cavity. Residual pump power can be used to pump an optical amplifier optically coupled to the laser to amplify its output. For example, an Er-doped fiber amplifier in a fiber master oscillator power amplifier (MOPA) configuration can be employed as described in Ball, G. A. and W. W. Morey (1992), Digest of Conference on Optical Fiber Communications, Optical Society of America, Washington, D.C. p. 97. Power output of the FFP lasers of this invention is significantly enhanced by use of fiber optic amplifiers. The theory and operation of fiber optic amplifiers is well-known in the art. Those of ordinary skill in the art can generally make appropriate selections of types and configurations of amplifiers that can be used in combination with the FFP lasers of this invention.

The FFP lasers of this invention are useful as light sources in a variety of communication, sensor and spectroscopy applications. Single-frequency and single-mode FFP lasers with $\lambda_s$ in the range of 1.55 nm are particularly useful in telecommunications applications. Broad-bandwidth tunable single-frequency and single-mode FFP lasers are particularly attractive for multi-channel telecommunications applications. The ultra-short fiber laser cavities of this invention are particularly well suited to broad-bandwidth tuning applications.

FFP lasers which emit two orthogonal polarization modes are attractive for polarization sensor applications as described in G. A. Ball et al. (1993) Optics Letts. 18(22):1976–1978. Polarization sensors can be used to measure temperature, strain, and pressure changes and any other environmental factor that effects birefringence in the active fiber. Because the active fibers of the FFP lasers of this invention are held within ferrules, they will generally be most applicable to temperature sensors. In order to adapt a FFP laser to a particular sensing application it may be necessary to modify the birefringence of the active fiber. It is well-known in the art that fiber birefringence can be modified by addition of certain dopants, such as germanium or aluminum.

FFP lasers which emit two orthongonal polarization modes can be converted to a single-polarization mode laser by use of D-shaped fiber in which the flat portion of the fiber is coated with metal. It is well-known in the art that such fibers absorb one polarization mode and the operation and implementation of D-shaped fibers is understood in the art.

As examples of fiber optic lasers of this invention, two-mirror FFP lasers were constructed having a single-wafered ferrule assembly with fiber gap of FIG. 2 supported and aligned in a low-loss, temperature compensated FFP alignment fixture of design shown in FIG. 7A and 7B. The ferrule holder was made of Kovar TM and had low-temperature coefficient stainless steel screws. Laser cavity length was tuned by changing the fiber gap by application of a voltage to the PZTs of the alignment fixture. Both the embedded mirror of the wafered ferrule and the end mirror of the mirror-ended ferrule were $TiO_2/SiO_2$ dielectric mirrors directly deposited, as discussed above, on the polished ends of the ferrules. A diode laser with center wavelength of about 982 nm (Spectra Diode Laboratories Model SDL-6321-Gi laser) was used to pump the system. The pump laser had a maximum available output power $P_p$ of about 85 mW, under the conditions used ($I_p=200$ mA). The active fiber lases at about 1550 nm. Pump radiation was passed through an isolator and at 980/1550 WDM to prevent feedback into the pump. Laser output was passed through an output isolator and monitored employing several FFP scanning interferometers with resolution ranging from 14.1 GHz to 30 kHz.

Two types of active fiber were examined: Er:Yb codoped phosphate glass fiber and Er:Yb codoped phospho-silica glass fiber. The phosphate glass fiber had Er:Yb doping of 1600:38,000 ppm (cutoff at about 1000 nm) and the phospho-silica glass fiber had Er:Yb doping of 1000:12,800 ppm (cutoff near 1120 nm). The phosphate glass fiber was made from phosphate glass manufactured by Schott Glass Technologies doped with Er and Yb by a rod-in-tube technique, as is well-understood in the art. This technique involved core drilling of a core from one glass and a cladding from a glass having a slightly different composition to obtain the necessary refractive-index difference. Er and Yb were contained only in the core. The phospho-silicate fiber was manufactured by a standard modified chemical-vapor-deposition (MCVD) process. J. E. Townsend et al. (1991) Electronics Letts. 27(21):1958–1959; J. E. Townsend et al. (1992) Materials Res. Soc. Symp. Proceedings 244:143–147 (Materials Research Society).

Active fiber lengths of about 1 mm to 55 μm were examined for the phosphate glass active fiber. Lasing was observed for all lengths of phosphate glass fiber examined except 55 μm (Table 1). Phospho-silicate fiber lengths of 500 μm to 142 μm were examined and all were observed to lase.

Both the input fiber and the active phosphate glass fiber support high order transverse modes at 980 nm. The lasing threshold and spectrum as a result were extremely sensitive to the pump coupling condition and to mechanical and thermal perturbations of the pump input fiber.

Figure 8:
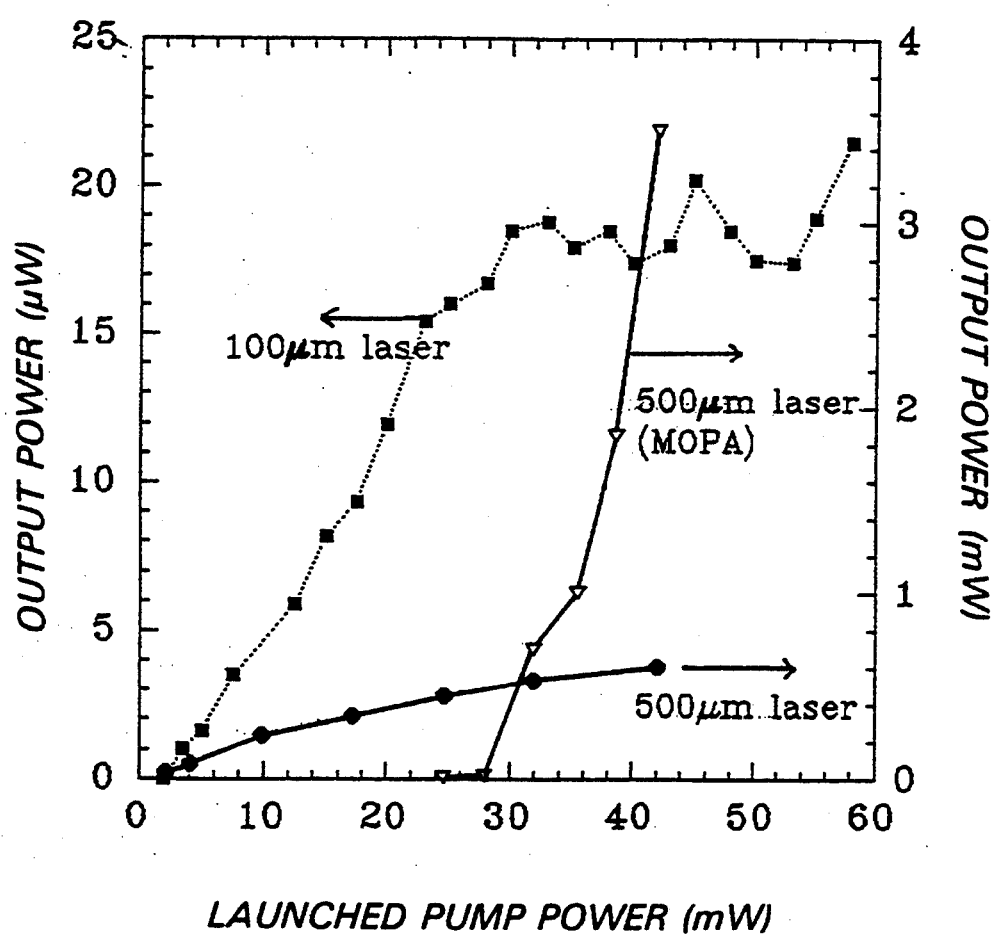
FIG. 8 is a graph of FFP laser output as a function of launched pump power. Two scales for output power (μW and mW) are indicated. Output of a FFP laser with 100 μm cavity and $R_1 = R_2 = 99.9\%$ is shown as closed squares on the μW scale. Output of a FFP laser with 500 μm cavity with $R_1 = 99.9\%$ and $R_2 = 99.4\%$. is shown as closed circles on the mW scale. Amplified output of the 500 μm ($R_1 = 99.9\%$, $R_2 = 99.4\%$) FFP laser coupled to an Er fiber amplifier is shown as open triangles on the mW scale.
Figure 9:
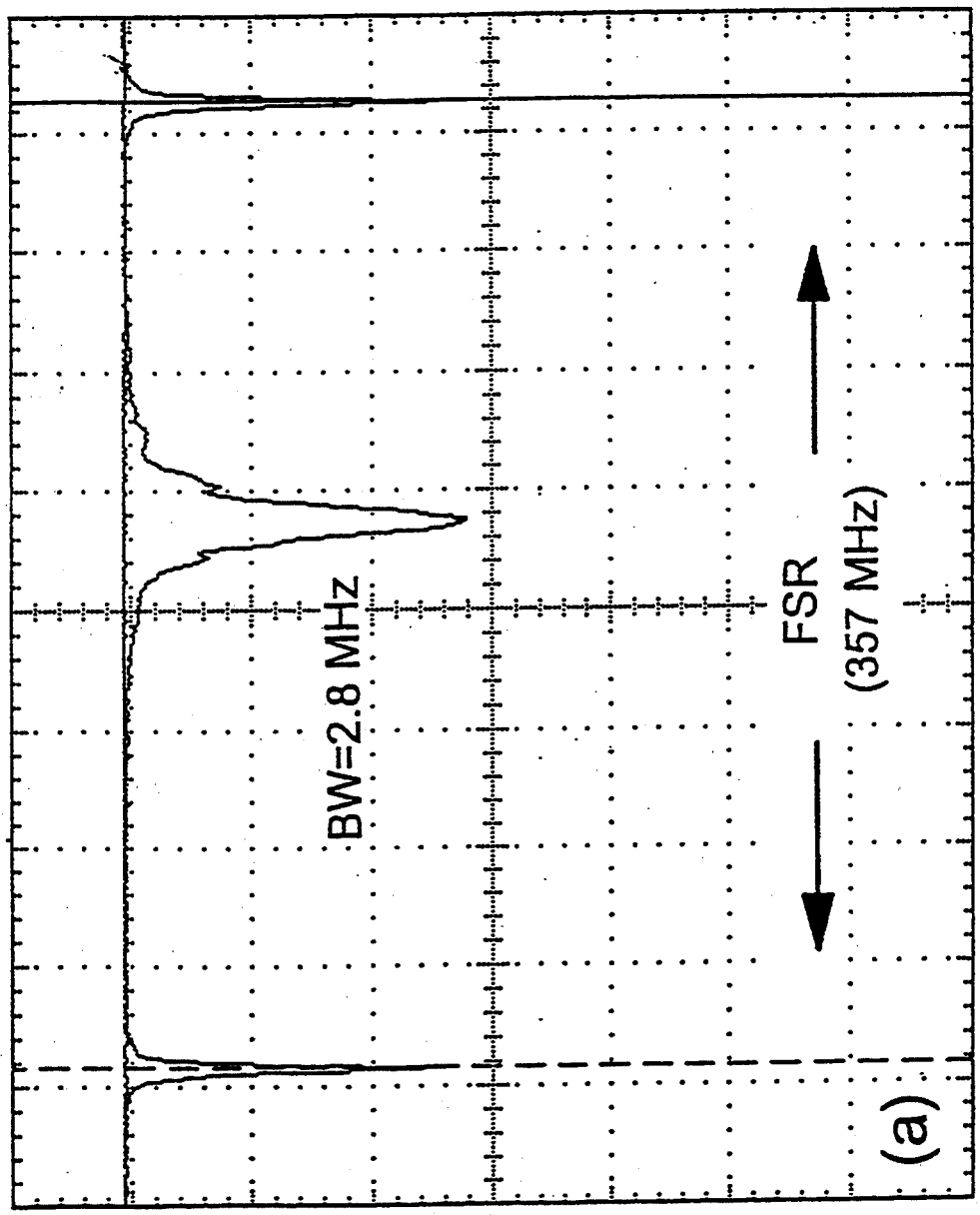
FIG. 9 is an optical spectrum of the output of a 100 μm FFP laser at $P_p \approx 18$ mW measured with an FFP scanning interferometer (FSR (free spectral range) = 357 MHz and bandwidth = 2.8 Mhz).

FIG. 8 (closed squares, μW scale) shows laser output as a function of launched pump power of a FFP laser with 100 μm cavity and $R_1=R_2=99.9\%$. The 100 μm laser has a threshold pump power of about 1.5 mW, a maximum output power of about 19 μW and a slope efficiency of about 0.07% before saturation at $P_p \approx 30$ mW. FIG. 9 illustrates single-frequency, single-polarization mode operation in the resolution-limited optical spectrum of the output of the 100 μm laser at $P_p \approx 18$ mW measured with an FFP scanning interferometer (FSR=357 MHz and bandwidth=2.8 MHz). Sidebands in the lasing profile correspond to second-order relaxation oscillation with a fundamental resonance (fr) at about 940 Khz with modulation depth<2%. The relaxation oscillation frequency of the 100 μm laser was about 1.4 Mhz at $P_p \approx 42$ mW resulting in sidebands in the optical spectrum at higher this pump power. The FSR of the 100 μm laser is calculated to be 7.7 nm.

Figure 10:
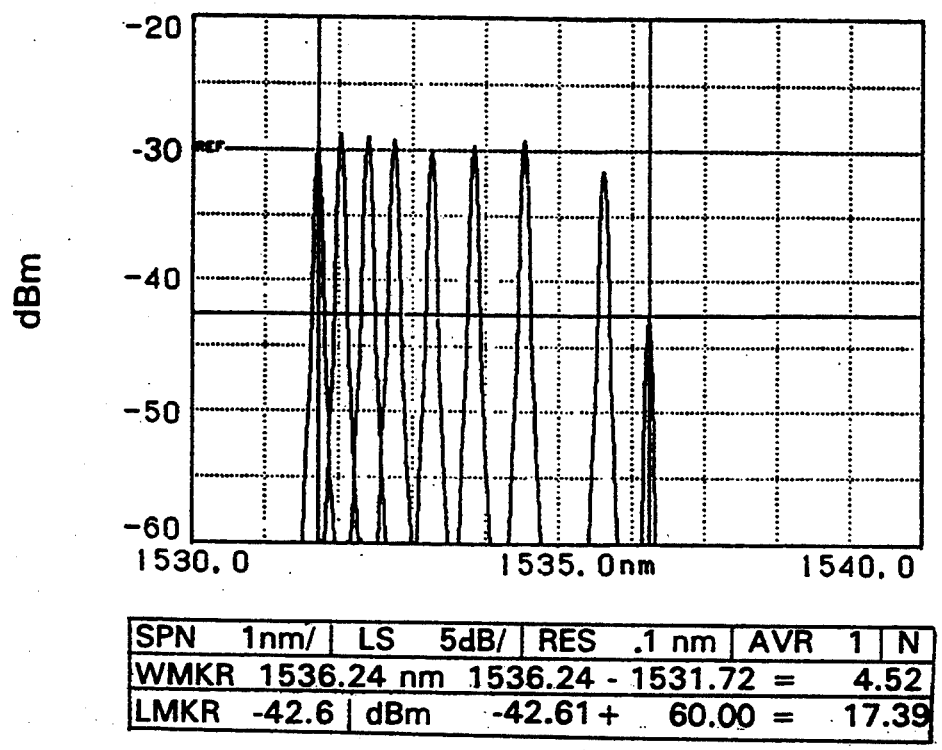
FIG. 10 shows optical spectra of a 100 μm FFP laser as a function of PZT tuning voltage over 4.52 nm illustrating hop-free/continuous wavelength tuning.

FIG. 10 illustrates hop-free continuous wavelength tuning of the 100 μm laser over 4.52 nm (about 59% of the free spectral range) using PZT tuning voltage from 0 to 14.3 V. In comparison, the tuning ranges of analogous FFP lasers with 199 and 158 μm cavity lengths were 77% and 76%, respectively, of the calculated FSR. Intra-cavity loss as a function of increasing fiber gap may be responsible for tuning limitations. Tuning range may also be limited by the sharp $Er^{+3}$ gain peak in phosphate glass host. The $Er^{+3}$ gain spectrum is dependent upon host glass. For example, the $Er^{+3}$ gain peak is broader, although somewhat less intense, in phophosilicate glass.

FIG. 8 (closed circles, mW scale) shows laser output as a function of launched pump power of a 500 μm cavity FFP laser with $R_1=99.9\%$ and $R_2=99.4\%$. This 500 μm laser has a maximum output power of about 0.6 mW at $P_p \approx 42$ mW with power slope efficiency of about 2.6%.

An Er-doped fiber amplifier ($Er^{3+}$ 0.09 wt %, length=2.5 m, NA=0.11 and cutoff 1400 nm) was spliced to the 500 μm ($R_1=99.9\%$, $R_2=99.4\%$) laser output pigtail. FIG. 8 (open triangles, mW scale) shows output power of the amplified 500 μm laser as a function of launched pump power. The maximum output power of the amplified laser was 4 mW.

Figure 11:
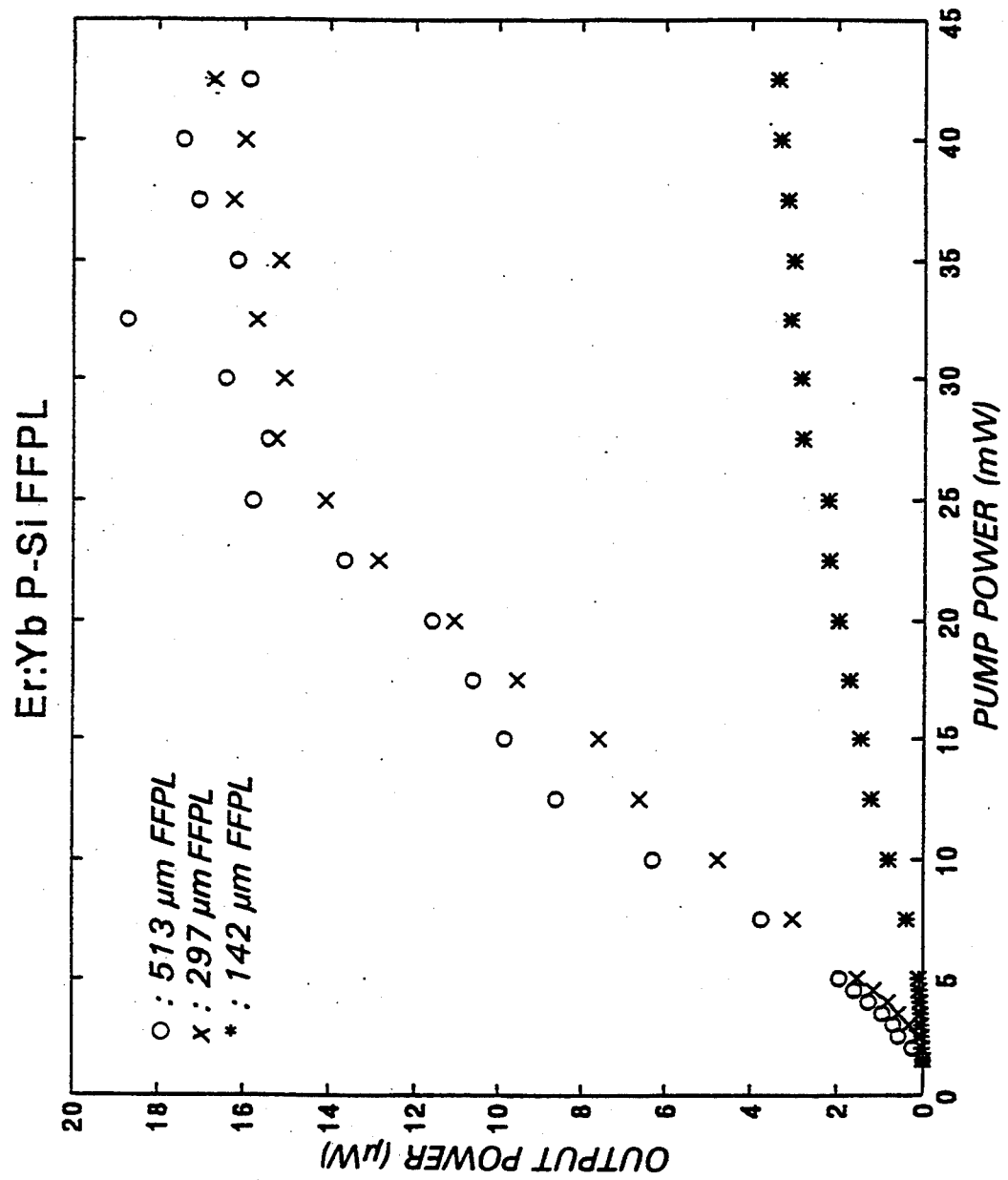
FIG. 11 is a graph of FFP laser output as a function of launched pump power for phospho-silica glass FFP lasers of 142 μm (*), 208 μm (X) and 513 μm (0) lengths.

FIG. 11 shows laser output as a function of launched pump power for three Er:Yb phospho-silica glass fiber lasers of 513, 208 and 142 μm. The shortest phospho-silica glass fiber laser exhibits single-frequency, single-polarization operation with a 5 mW pump power threshold, slope efficiency of about 0.01% and a maximum power of about 3 μW. In all phospho-silica glass fiber lasers tested $R_1=R_2=99.9\%$. The relaxation oscillation frequency is 475 kHz with a modulation depth of about 7% at $P_p=32$ mW. Single-polarization lasing was observed for all pump and tuning ranges. At this ultra-short fiber length the fiber birefringence may be too weak to induce a polarization mode or the lasing threshold for the orthogonal polarization mode may be higher.

Figure 12:
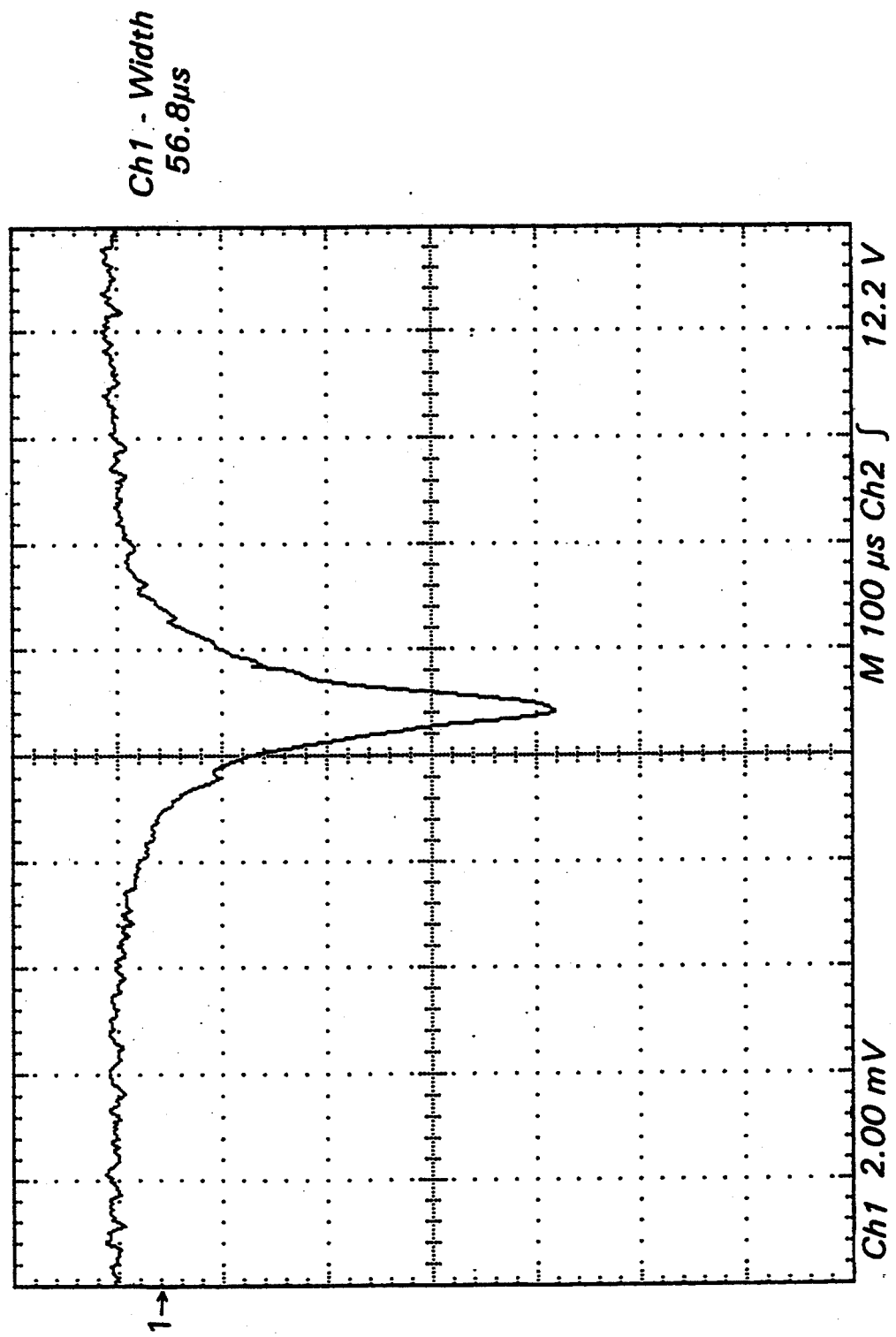
FIG. 12 is an optical spectrum of the 142 μm doped phospho-silica glass FFP laser output showing single-frequency, single-polarization operation. The spectrum was obtained with a FFP-SI (FSR = 357 MHz, BW = 2.8 MHz).

FIG. 12 is the optical spectrum of the 142 μm Er:Yb phospho-silica glass laser obtained by an FFP scanning interferometer (FSR=357 MHz, BW=2.8 MHz) which illustrates single-frequency, single-polarization operation. This laser was extremely sensitive to cavity alignment and an index-matching fluid was required to obtain continuous wavelength tuning over 1.45 nm. This corresponds to only about 26% of the FSR. It is believed that 142 μm is close to the minimum length of this fiber required for lasing in the resonator design used. Intra-cavity loss as a function of increasing fiber gap with tuning may be responsible for tuning limitation. In contrast, the 208 μm laser was tunable over 3.33

μm (88% of its FSR). The use of an index-matching fluid in the fiber gap had somewhat increased the tuning range of the 208 μm laser. It is likely that the index matching fluid helps to reduce intra-cavity loss as a function of tuning.

Those of ordinary skill in the art to which this invention pertains will appreciate that the configurations, materials and techniques specifically described in the specification and figures herein can be modified, altered or adapted while achieving the objectives of this invention. All such alterations, modifications and adaptations that embody the principles of this invention are encompassed within the spirit and scope of this invention.

TABLE 1

Summary of Er:Yb Doped Fiber Laser Results[1]

| Length | Threshold $P_p$ | Slope Efficiency | Maximum $P_{out}^2$ | Tuning Range[3] |
|---|---|---|---|---|
| Phosphate glass fiber | | | | |
| 55 μm | | NO LASING | | |
| 76 μm | 6 mW | | ~1-2 μW | |
| 89 μm | 3.5 mW | | 16 μW | |
| 100 μm | 1.5 mW | 0.07% | 19 μW | 4.52 nm (59% FSR) |
| 158 μm | | | | 3.72 nm (76% FSR) |
| 199 μm | | | | 2.97 nm (795 FSR) |
| 500 μm | | | 250 μW[4] | |
| 500 μm[5] | | 2.6% | 600 μW[4] | |
| 500 μm[5,6] | | | 4,000 μW[4] | |
| Phospho-silica fiber | | | | |
| 142 μm | 5 mW | ~0.01% | ~3.1 μW[7] | 1.45 nm (26% FSR)[8] |
| 208 μm | 2.5 mW | 0.05% | 15.7 μW[7] | 3.33 nm (88% FSR)[8] |
| 513 μm | 2 mW | 0.06% | 19 μW | |

[1]Unless otherwise indicated $R_1 = R_2 = 99.9\%$ in lasers tested; a single-pass pump laser configuration was employed in all cases.
[2]At $P_p \sim 30$ mW, unless otherwise indicated.
[3]Unless otherwise indicated, no index matching fluid was used.
[4]At $P_p \sim 42$ mW.
[5]$R_1 = 99.9\%$, $R_2 = 99.4\%$.
[6]Amplified with an Er-doped fiber amplifier (18 mW max. pump power, 2.5 m, [$Er^{3+}$] = 0.09 wt %).
[7]$P_p \sim 32$ mW.
[8]Index-matching fluid was used in the fiber gap.

We claim:

1. A fiber ferrule assembly having a fiber laser gain cavity which comprises:
   a first and a second ferrule element each having an internal and an external end, each having a substantially axial bore therethrough for receiving optical fiber, each having at least one mirror transverse to the optical fiber in the axial bore, and each ferrule element having an optical fiber end at its internal end and optical fiber extending from its external end; said ferrule elements positioned with respect to each other such that the internal ends are opposed and optionally spaced apart to form said laser gain cavity between opposing reflective surfaces of two of the mirrors in said ferrule assembly with the fibers of the opposing ferrule elements aligned to allow optical transmission through the fibers of the ferrule assembly wherein the optical fiber throughout said ferrule assembly is single transverse mode optical fiber and the optical fiber in said laser gain cavity comprises an active optical fiber about one millimeter or less in length.

2. The fiber ferrule assembly of claim 1 wherein the active optical fiber is a rare-earth ion doped glass fiber.

3. The fiber ferrule assembly of claim 2 wherein the active optical fiber is an Er:Yb codoped glass fiber.

4. The fiber ferrule assembly of claim 1 wherein said active optical fiber is about 500 μm or less in length.

5. The fiber ferrule assembly of claim 2 wherein said first ferrule element is a wafered ferrule with an embedded mirror and second ferrule element is a mirror-ended ferrule and the laser gain cavity is formed between said embedded mirror and the mirrored end of said second ferrule.

6. The fiber ferrule assembly of claim 5 wherein the opposed internal ends of said ferrules are spaced apart to form a fiber gap within the laser gain cavity.

7. The fiber ferrule assembly of claim 5 wherein the opposed internal ends of said ferrules with fibers aligned are rigidly bonded together to form the laser gain cavity.

8. A fiber optic laser which comprises the fiber ferrule assembly of claim 1 and which further comprises a pump laser for pumping energy into said fiber laser gain cavity such that it can be absorbed by the lasing material in the active optical fiber to induce sufficient population inversion therein to generate lasing of the active optical fiber.

9. The fiber optic laser of claim 8 having a rare-earth doped active fiber and further comprising a means for changing the length of the laser gain cavity to thereby tune the wavelength emitted by the laser wherein said first ferrule element is a wafered ferrule with an embedded mirror and second ferrule element is a mirror-ended ferrule and the laser gain cavity is formed between said embedded mirror and the mirrored end of said second ferrule, wherein the opposed internal ends of said ferrules with fibers aligned are rigidly bonded together to form the laser gain cavity and wherein the laser gain cavity is temperature tuned.

10. The fiber optic laser of claim 8 further comprising a support for holding the first and second ferrule elements such that the fibers in the opposing ferrule elements are aligned and wherein the support means comprises a means for adjusting the relative alignment of the ferrule elements.

11. The fiber optic laser of claim 10 wherein the support provides for rotary alignment of the ferrules and secures each ferrule element in alignment within the support by means of three-point contact around each ferrule element.

12. The fiber optic laser of claim 11 having a rare-earth doped active fiber and further comprising a means for changing the length of the laser gain cavity to thereby tune the wavelength emitted by the laser wherein said first ferrule element is a wafered ferrule with an embedded mirror and second ferrule element is a mirror-ended ferrule and the laser gain cavity is formed between said embedded mirror and the mirrored end of said second ferrule and wherein the laser gain cavity is temperature tuned.

13. The fiber optic laser of claim 8 wherein the ferrule elements are spaced apart to form a fiber gap between two of the mirrors of the ferrule assembly and which further comprises a support for holding the ferrules in alignment which support means comprises a means for adjusting the alignment of the ferrule elements in the support means and a means for electromechanically tuning the wavelength emitted by the laser by changing the length of the fiber gap without substantial loss of fiber alignment.

14. The fiber optic laser of claim 13 wherein said support means further comprises adjustable means for selectively changing the temperature coefficient of said laser.

15. The fiber optic laser of claim 14 wherein said active optical fiber is a rare-earth doped glass fiber.

16. The fiber optic laser of claim 15 wherein said active optical fiber is a sensitized rare-earth doped glass fiber.

17. The fiber optic laser of claim 16 wherein said active optical fiber is an Er:Yb codoped glass fiber.

18. The fiber optic laser of claim 14 wherein said support has substantially smooth cylindrical passageways for receiving each of said ferrule elements, wherein said adjustable means for changing the temperature coefficient of said laser comprises an adjustable means for changing the points of contact between a ferrule element and the passageway into which it is received and wherein said means for electromechanically tuning the wavelength emitted by the laser comprises a piezoelectric transducer positioned in said support such that selective application of a voltage to said transducer changes the length of the laser gain cavity.

19. The fiber optic laser of claim 18 wherein said support comprises a first ferrule holder and a second ferrule holder rigidly connected to each other and held in fixed relative position with respect to each other by a holder bridging means, both of said ferrule holders having adjustable means for securing a ferrule therein and wherein the relative position of said holders is such that the optical fibers of the ferrules held by the holders can be brought into alignment by said adjustable means for changing the relative axial alignment of said ferrules.

20. The fiber optic laser of claim 19 wherein said adjustable means for changing the temperature coefficient of the laser comprises a plurality of independently adjustable mounting screws in a ferrule holder and along the length of the holder passageway which can be adjusted by turning to extend through the holder body into said passageway to rigidly contact and secure the ferrule therein.

21. The fiber optic laser of claim 20 wherein said adjustable means for changing the longitudinal temperature coefficient is in said first ferrule holder and the cylindrical passageway of said second ferrule holder comprises a transitorily deformable sleeve for receiving a ferrule therein wherein said adjustable means for changing the relative axial alignment of said ferrules comprises a means for selectively deforming said sleeve such that said sleeve contacts the ferrule therein to thereby change the relative alignment of the optical fibers of the laser.

22. The fiber optic laser of claim 21 wherein said means for selectively deforming the sleeve of said first holder comprises a plurality of alignment screws which extend through the body of said second holder to selectively contact said deformable sleeve.

23. The fiber optic laser of claim 22 wherein said bridging means comprises a plurality of brackets extending outwardly from each of said ferrule holders with a piezoelectric transducer bonded between corresponding brackets of each of said holders.

24. The fiber optic laser of claim 18 which is temperature compensated which further comprises a sleeve positioned around the circumference of each of said ferrules wherein said support comprises a first and second ferrule holder each of which has an internal end and a piezoelectric transducer means for electromechanically changing the length of said laser gain cavity interposed between the internal ends of said holders such that the distance between the holders can be changed to thereby change the laser gain cavity length, each of said holders having a cylindrical passageway therethrough for receiving said ferrule and sleeve and a plurality of adjustable means along the length of said passageway for contacting said sleeve which in turn contacts said ferrule to secure it within said passageway.

25. The fiber optic laser of claim 24 wherein said piezoelectric transducer is a single transducer element having a first and second end and a longitudinal axis along which it expands on application of a voltage and also having a cylindrical passageway along said expanding axis for receiving the internal ends of said ferrules said transducer interposed between the internal ends of said holders, each end of said piezoelectric transducer rigidly bonded to the internal end of a ferrule holder.

26. The fiber optic laser of claim 25 wherein said sleeve is made of a material which has a positive temperature coefficient larger than that of the material of which the holder is made.

27. The fiber optic laser of claim 26 wherein said means for securing said ferrule sin said holder comprise one set of screws equiangularly distributed around the circumference of said passageway which function to change the relative alignment of the ferrules and a plurality of screws along the length of the passageway which extend into said passageway from the same direction which function to allow adjustment of the longitudinal temperature coefficient of said laser.

28. The fiber optic laser of claim 13 wherein said support comprises:
two ferrule holders for receiving and securing ferrule elements each of which has an internal longitudinal end, and a piezoelectric transducer for electronmechanically changing the length of the laser gain cavity interposed between and bonded to the internal ends of said ferrule holders wherein the laser gain cavity formed by opposing the internal ends of the ferrules within the support between the ferrule holders wherein the length of the laser gain cavity can be changed by application of a voltage to the piezoelectric transducer and wherein each of said holders comprises:
a body having a passageway extending the longitudinal length of the body for receiving a ferrule, said passageway shaped along its longitudinal length to provide flats for three-point contact between the holder body and the ferrule along the length of the ferrule in the holder, means for securing said ferrule in said shaped passageway positioned in a line along the longitudinal length of said passageway to establish three lines of contact along the length of the ferrule between the ferrule and the holder body and means for receiving and bonding to said piezoelectric transducer at said internal longitudinal end.

29. The fiber optic laser of claim 28 wherein said means for securing said ferrule in said shaped passageway to establish three-point contact comprises:

a plurality of tapped holes for receiving screws positioned in a line along the longitudinal length of the holder which extend inward from the surface of the body toward said passageway; and ferrule retention means intermediate between the bottom of each of said tapped holes and said passageway and positioned such that tightening a screw into a tapped hole displaces said retention means such that it contacts and thereby secures said ferrule element in the passageway.

30. The fiber optic laser of claim 29 wherein the ferrules are Pyrex TM and the body of said holders is fabricated from a low-expansion metal alloy having a thermal expansion coefficient at room temperature of between about 5.4–1.8 ppm/°C.

31. The fiber optic laser of claim 30 wherein the body is fabricated from a low-expansion metal alloy having a thermal expansion coefficient of about 5 ppm/°C. and wherein said screws are fabricated from low-expansion coefficient stainless steel having a thermal expansion coefficient of about 10 ppm/°C.

32. The fiber optic laser of claim 8 further comprising an optical amplifier optically coupled to said laser gain cavity and said pump laser such that residual pump energy is absorbed in said amplifier resulting in amplification of the output of said laser.

33. The fiber optic laser of claim 32 wherein said active optical fiber is a rare-earth ion doped glass fiber and said optical amplifier is a rare-earth ion doped glass fiber amplifier.

34. The fiber optic laser of claim 33 where said active optical fiber is an Er:Yb codoped glass fiber and wherein said optical amplifier is an Er ion doped fiber amplifier.

35. The fiber optic laser of claim 8 wherein said pump laser is a diode laser optically coupled to said laser gain cavity.

36. The fiber optic laser of claim 1 wherein said fiber laser gain cavity is a multiple cavity.

* * * * *